(12) United States Patent
Lei et al.

(10) Patent No.: US 12,550,028 B2
(45) Date of Patent: Feb. 10, 2026

(54) INTERFERENCE MITIGATION BASED ON USER EQUIPMENT MOBILITY

(71) Applicant: QUALCOMM Incorporated, San Diego, CA (US)

(72) Inventors: Jing Lei, San Diego, CA (US); Ozcan Ozturk, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/468,182

(22) Filed: Sep. 15, 2023

(65) Prior Publication Data

US 2025/0097804 A1 Mar. 20, 2025

(51) Int. Cl.
*H04W 4/00* (2018.01)
*H04W 36/00* (2009.01)
*H04W 36/20* (2009.01)

(52) U.S. Cl.
CPC ....... *H04W 36/20* (2013.01); *H04W 36/0058* (2018.08); *H04W 36/0085* (2018.08)

(58) Field of Classification Search
CPC ............ H04W 36/20; H04W 36/0085; H04W 36/0058
See application file for complete search history.

(56) References Cited

U.S. PATENT DOCUMENTS

| | | | |
|---|---|---|---|
| 2021/0235339 A1 | 7/2021 | Babaei | |
| 2023/0055304 A1* | 2/2023 | Shim | H04W 72/541 |
| 2023/0164674 A1* | 5/2023 | Zhou | H04W 36/362 |
| | | | 370/252 |
| 2023/0189382 A1* | 6/2023 | Haustein | H04W 76/20 |
| | | | 370/329 |
| 2023/0216648 A1* | 7/2023 | Zhang | H04B 17/345 |
| | | | 370/252 |

(Continued)

FOREIGN PATENT DOCUMENTS

| | | |
|---|---|---|
| WO | 2022056822 | 3/2022 |
| WO | 2022178819 | 9/2022 |
| WO | 2023133070 | 7/2023 |

OTHER PUBLICATIONS

International Search Report and Written Opinion—PCT/US2024/045515—ISA/EPO—Dec. 19, 2024.

*Primary Examiner* — Abdelnabi O Musa
(74) *Attorney, Agent, or Firm* — QUALCOMM Incorporated

(57) ABSTRACT

Various aspects of the present disclosure generally relate to wireless communication. In some aspects, a first network node may receive, from a second network node, a first indication of an air interface resource configuration that is associated with the second network node. The first network node may transmit a cross link interference (CLI) measurement configuration that is addressed to a user equipment (UE) associated with the first network node, the CLI measurement configuration being associated with a CLI measurement procedure at the UE and being based at least in part on the air interface resource configuration. The first network node may receive a second indication of a CLI measurement report that is associated with the UE, the CLI measurement report including a CLI metric that is based at least in part on the CLI measurement configuration. Numerous other aspects are described.

30 Claims, 12 Drawing Sheets

(56) References Cited

U.S. PATENT DOCUMENTS

| | | | |
|---|---|---|---|
| 2023/0232472 A1* | 7/2023 | Xu ........................ | H04W 72/25 370/252 |
| 2024/0007924 A1* | 1/2024 | Araujo .................. | H04W 36/30 |
| 2024/0049252 A1* | 2/2024 | Gulati ................... | H04B 17/309 |
| 2024/0098588 A1* | 3/2024 | Da Silva ............... | H04W 24/10 |

* cited by examiner

INTERFERENCE MITIGATION BASED ON USER EQUIPMENT MOBILITY

FIELD OF THE DISCLOSURE

Aspects of the present disclosure generally relate to wireless communication and to techniques and apparatuses for interference mitigation based on user equipment mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node. The method may include receiving, from a second network node, a first indication of an air interface resource configuration that is associated with the second network node. The method may include transmitting a cross link interference (CLI) measurement configuration that is addressed to a user equipment (UE) associated with the first network node, the CLI measurement configuration being associated with a CLI measurement procedure at the UE and being based at least in part on the air interface resource configuration. The method may include receiving a second indication of a CLI measurement report that is associated with the UE, the CLI measurement report including a CLI metric that is based at least in part on the CLI measurement configuration.

Some aspects described herein relate to a method of wireless communication performed by a UE. The method may include receiving, from a first network node, a CLI measurement configuration that indicates to perform a CLI measurement procedure based at least in part on an air interface resource configuration that is associated with a second network node. The method may include transmitting an indication of a CLI measurement report that is based at least in part on the CLI measurement configuration. The method may include performing a handover from the first network node to the second network node based at least in part on the CLI measurement report.

Some aspects described herein relate to an apparatus for wireless communication at a first network node. The apparatus may include one or more memories and one or more processors coupled to the one or more memories. The one or more processors may be configured to receive, from a second network node, a first indication of an air interface resource configuration that is associated with the second network node. The one or more processors may be configured to transmit a CLI measurement configuration that is addressed to a UE associated with the first network node, the CLI measurement configuration being associated with a CLI measurement procedure at the UE and being based at least in part on the air interface resource configuration. The one or more processors may be configured to receive a second indication of a CLI measurement report that is associated with the UE, the CLI measurement report including a CLI metric that is based at least in part on the CLI measurement configuration.

Some aspects described herein relate to an apparatus for wireless communication at a UE. The apparatus may include one or more memories and one or more processors coupled to the one or more memories. The one or more processors may be configured to receive, from a first network node, a CLI measurement configuration that indicates to perform a CLI measurement procedure based at least in part on an air interface resource configuration that is associated with a second network node. The one or more processors may be configured to transmit an indication of a CLI measurement report that is based at least in part on the CLI measurement configuration. The one or more processors may be configured to perform a handover from the first network node to the second network node based at least in part on the CLI measurement report.

Some aspects described herein relate to a non-transitory computer-readable medium that stores a set of instructions for wireless communication by a first network node. The set of instructions, when executed by one or more processors of the first network node, may cause the first network node to receive, from a second network node, a first indication of an air interface resource configuration that is associated with the second network node. The set of instructions, when executed by one or more processors of the first network node, may cause the first network node to transmit a CLI measurement configuration that is addressed to a UE associated with the first network node, the CLI measurement configuration being associated with a CLI measurement procedure at the UE and being based at least in part on the air interface resource configuration. The set of instructions, when executed by one or more processors of the first network node, may cause the first network node to receive a second indication of a CLI measurement report that is associated with the UE, the CLI measurement report including a CLI metric that is based at least in part on the CLI measurement configuration.

Some aspects described herein relate to a non-transitory computer-readable medium that stores a set of instructions for wireless communication by a UE. The set of instructions, when executed by one or more processors of the UE, may cause the UE to receive, from a first network node, a CLI measurement configuration that indicates to perform a CLI measurement procedure based at least in part on an air interface resource configuration that is associated with a second network node. The set of instructions, when executed by one or more processors of the UE, may cause the UE to transmit an indication of a CLI measurement report that is based at least in part on the CLI measurement configuration. The set of instructions, when executed by one or more processors of the UE, may cause the UE to perform a handover from the first network node to the second network node based at least in part on the CLI measurement report.

Some aspects described herein relate to an apparatus for wireless communication. The apparatus may include means for receiving, from a second network node, a first indication of an air interface resource configuration that is associated with the second network node. The apparatus may include means for transmitting a CLI measurement configuration that is addressed to a UE associated with the first network node, the CLI measurement configuration being associated with a CLI measurement procedure at the UE and being based at least in part on the air interface resource configuration. The apparatus may include means for receiving a second indication of a CLI measurement report that is associated with the UE, the CLI measurement report including a CLI metric that is based at least in part on the CLI measurement configuration.

Some aspects described herein relate to an apparatus for wireless communication. The apparatus may include means for receiving, from a first network node, a CLI measurement configuration that indicates to perform a CLI measurement procedure based at least in part on an air interface resource configuration that is associated with a second network node. The apparatus may include means for transmitting an indication of a CLI measurement report that is based at least in part on the CLI measurement configuration. The apparatus may include means for performing a handover from the first network node to the second network node based at least in part on the CLI measurement report.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
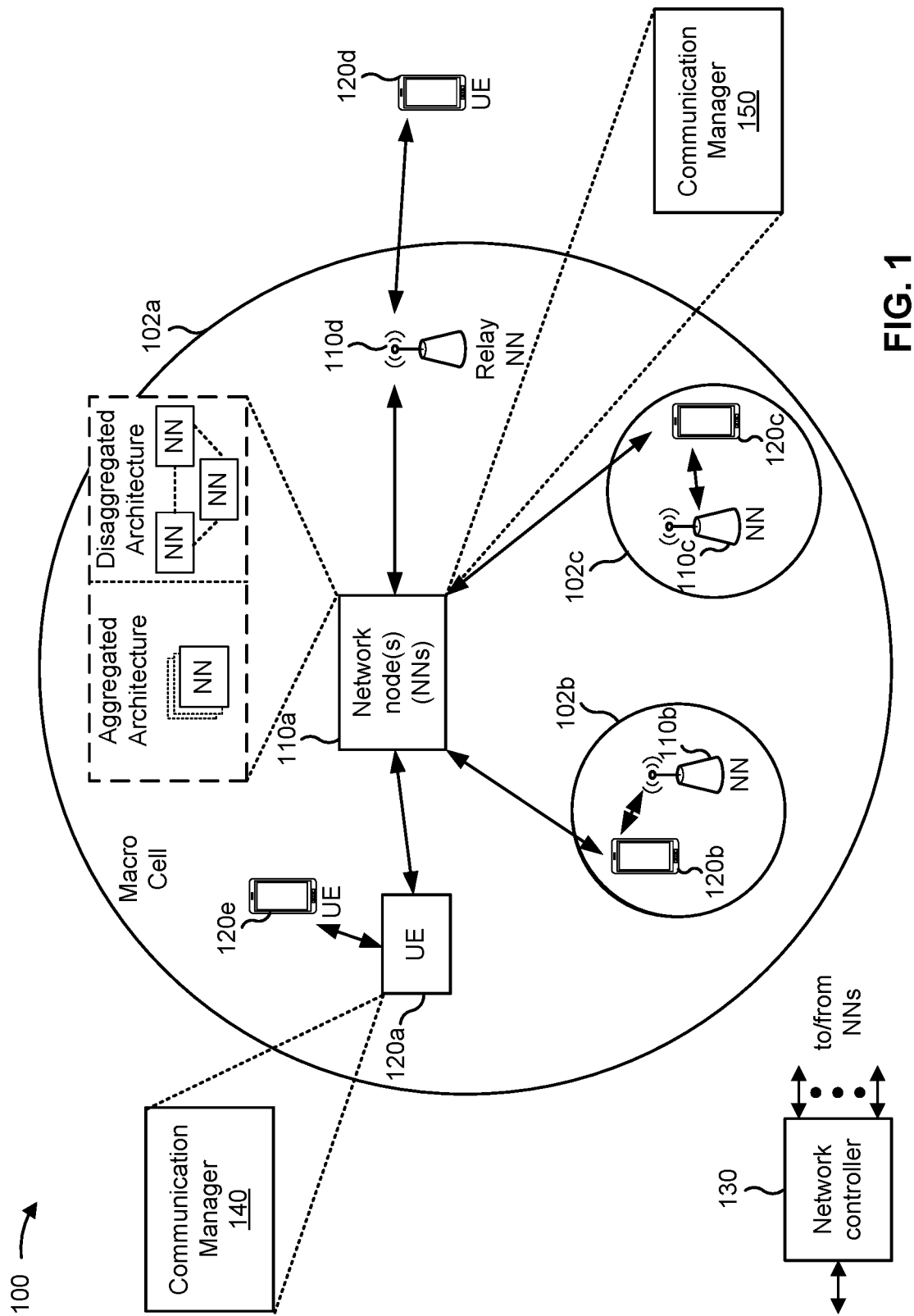
FIG. 1 is a diagram illustrating an example of a wireless network, in accordance with the present disclosure.

Sub-band full-duplex (SBFD) combined with dynamic time division duplex (D-TDD) may allow a network node to dynamically and/or flexibly change air interface resource allocations between uplink (UL) communications and downlink (DL) communications based on a variety of factors, such as a throughput demand, a data transfer latency condition, and/or a communication prioritization. The ability to dynamically and/or flexibly change air interface resource allocations may enable the network node to concurrently service a user equipment (UE) and/or multiple UEs with varying operating conditions (e.g., a prioritization condition, a data transfer latency condition, a data throughput condition, and/or a reliability condition) in a more efficient manner relative to legacy time division duplex (TDD) communications. However, dynamically modifying an assignment of an air interface resource (e.g., from DL to UL and/or vice versa) may result in cross link interference (CLI), and the CLI may result in degraded signal quality and/or degraded communications, such as communications that fail to satisfy a quality-of-service (QOS) condition, communications with increased recovery bit errors, communications with increased data transfer latencies, and/or communications with decreased data throughput.

Various aspects described herein generally relate to interference mitigation based on UE mobility. Some aspects relate more specifically to a UE performing a mobility procedure, such as a cell-level mobility procedure associated with changing a cell and/or a beam-level mobility procedure associated with changing a communication beam, to mitigate CLI. In some aspects, a first network node may receive a first indication of an air interface resource configuration that is associated with a second network node. For example, the air interface resource configuration may indicate one or more air interface resources (e.g., a frequency partition, a time partition, and/or a beam) that the second network node has assigned to a UE for uplink communications. Based at least in part on receiving the first indication, the first network node May transmit a CLI measurement configuration that is addressed to a UE and is associated with a CLI measurement procedure at a UE. In some aspects, the first network node may receive a second indication of a CLI measurement report that is based at least in part on the CLI measurement configuration. Alternatively, or additionally, the first network node may perform a mobility procedure with the UE, such as a handover that is associated with the UE disconnecting from the first network node and/or connecting to the second network node. Performing the mobility procedure with the UE may mitigate CLI based at least in part on changing one or more air interface resources used by the UE.

In some aspects, a UE may receive, from a first network node, a CLI measurement configuration that indicates to perform a CLI measurement procedure that is based at least in part on an air interface resource configuration associated with a second network node. The UE may transmit an indication of a CLI measurement report that is based at least in part on the CLI measurement configuration. The UE may perform a mobility procedure (e.g., a cell-level mobility procedure and/or a beam-level mobility procedure) based at least in part on the CLI measurement report. To illustrate, the UE may trigger a UE-initiated handover, may receive an instruction to perform a handover, and/or may receive an air interface resource allocation that avoids the use of one or more air interface resources associated with CLI that satisfies a threshold.

Based at least in part on a CLI metric, a UE may perform a mobility procedure (e.g., a handover procedure and/or a switching procedure) that mitigates CLI observed by the UE and/or caused by the UE. In some aspects, the mobility procedure may result in the UE disconnecting from a first network node and/or connecting to a second network node. Alternatively, or additionally, the UE may receive an update to an air interface resource assignment (e.g., a frequency partition, a time partition, and/or a beam) that is configured to avoid communication in an air interface resource associated with observed CLI. The change in network node connections and/or usage of an air interface resource may mitigate CLI experienced by the UE and/or caused by the UE based at least in part on avoiding the use of an air interface resource associated with CLI that is observed by the UE. For instance, the change in an air interface resource assignment (e.g., based at least in part on a cell-level mobility procedure and/or a beam-level mobility procedure) to the UE may result in the UE observing less CLI and/or causing less CLI at another UE. Observing less CLI and/or causing less CLI may result in an improved signal quality and/or improved communications, such as communications that satisfy a QoS condition, communications with reduced recovery bit errors, communications with reduced data transfer latencies, and/or communications with increased data throughput.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., a network node 110) may include a communication manager 150. As described in more detail elsewhere herein, the communication manager 150 may receive, from a second network node, a first indication of an air interface resource configuration that is associated with the second network node; transmit a CLI measurement configuration that is addressed to a UE associated with the first network node, the CLI measurement configuration being associated with a CLI measurement procedure at the UE and being based at least in part on the air interface resource configuration; and receive a second indication of a CLI measurement report that is associated with the UE, the CLI measurement report including a CLI metric that is based at least in part on the CLI measurement configuration. Additionally, or alternatively, the communication manager 150 may perform one or more other operations described herein.

In some aspects, a UE (e.g., a UE 120) may include a communication manager 140. As described in more detail elsewhere herein, the communication manager 140 may receive, from a first network node, a CLI measurement configuration that indicates to perform a CLI measurement procedure based at least in part on an air interface resource configuration that is associated with a second network node; transmit an indication of a CLI measurement report that is based at least in part on the CLI measurement configuration; and perform a handover from the first network node to the second network node based at least in part on the CLI measurement report. Additionally, or alternatively, the communication manager 140 may perform one or more other operations described herein.

As indicated above, FIG. 1 is provided as an example. Other examples may differ from what is described with regard to FIG. 1.

Figure 2:
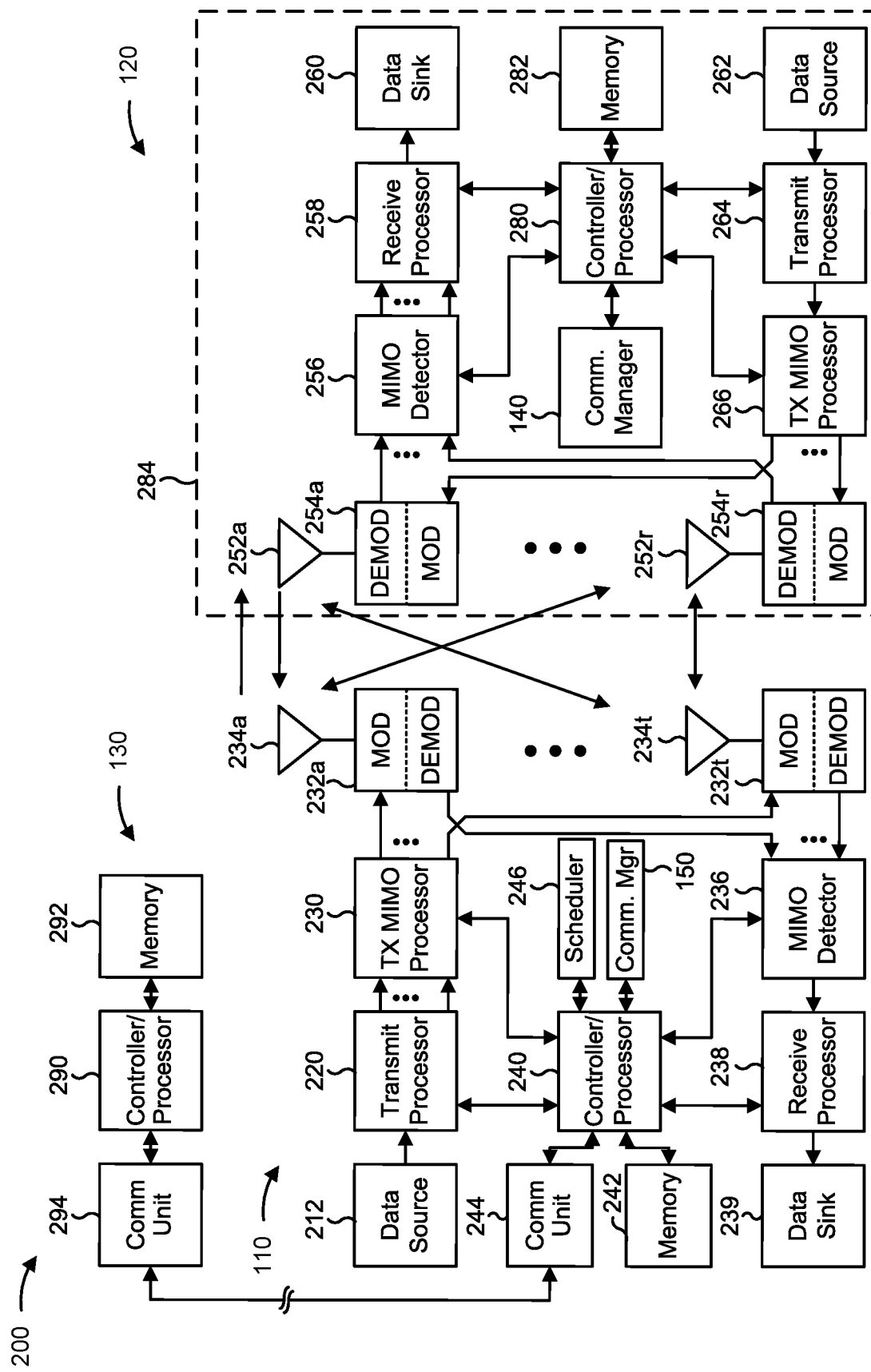
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with interference mitigation based on UE mobility, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a network node (e.g., a network node 110) includes means for receiving, from another network node, a first indication of an air interface resource configuration that is associated with the second network node; means for transmitting a CLI measurement configuration that is addressed to a UE associated with the first network node, the CLI measurement configuration being associated with a CLI measurement procedure at the UE and being based at least in part on the air interface resource configuration; and/or means for receiving a second indication of a CLI measurement report that is associated with the UE, the CLI measurement report including a CLI metric that is based at least in part on the CLI measurement configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., a UE 120) includes means for receiving, from a first network node, a CLI measurement configuration that indicates to perform a CLI measurement procedure based at least in part on an air interface resource configuration that is associated with a second network node; means for transmitting an indication of a CLI measurement report that is based at least in part on the CLI measurement configuration; and/or means for performing a handover from the first network node to the second network node based at least in part on the CLI measurement report. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
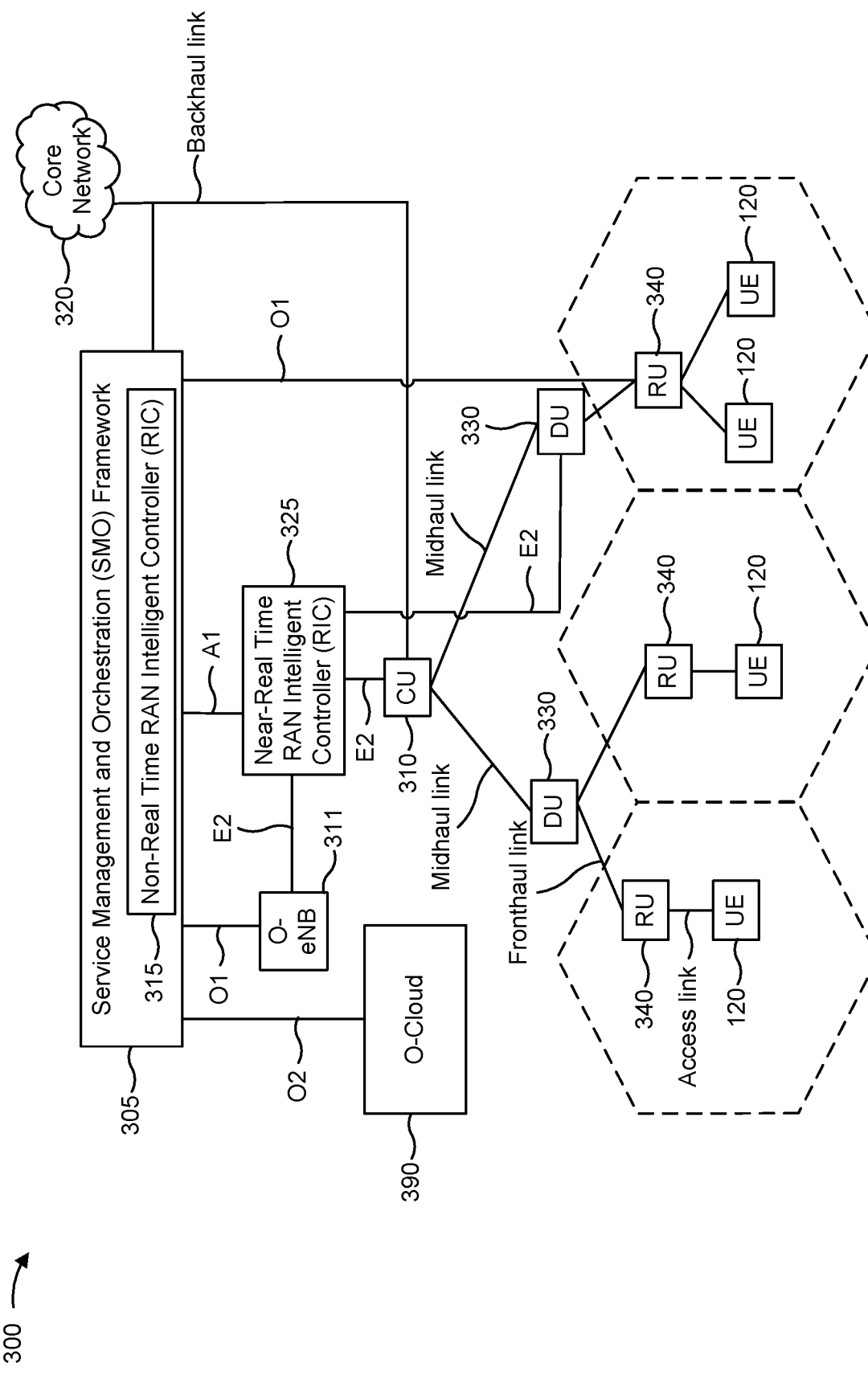
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
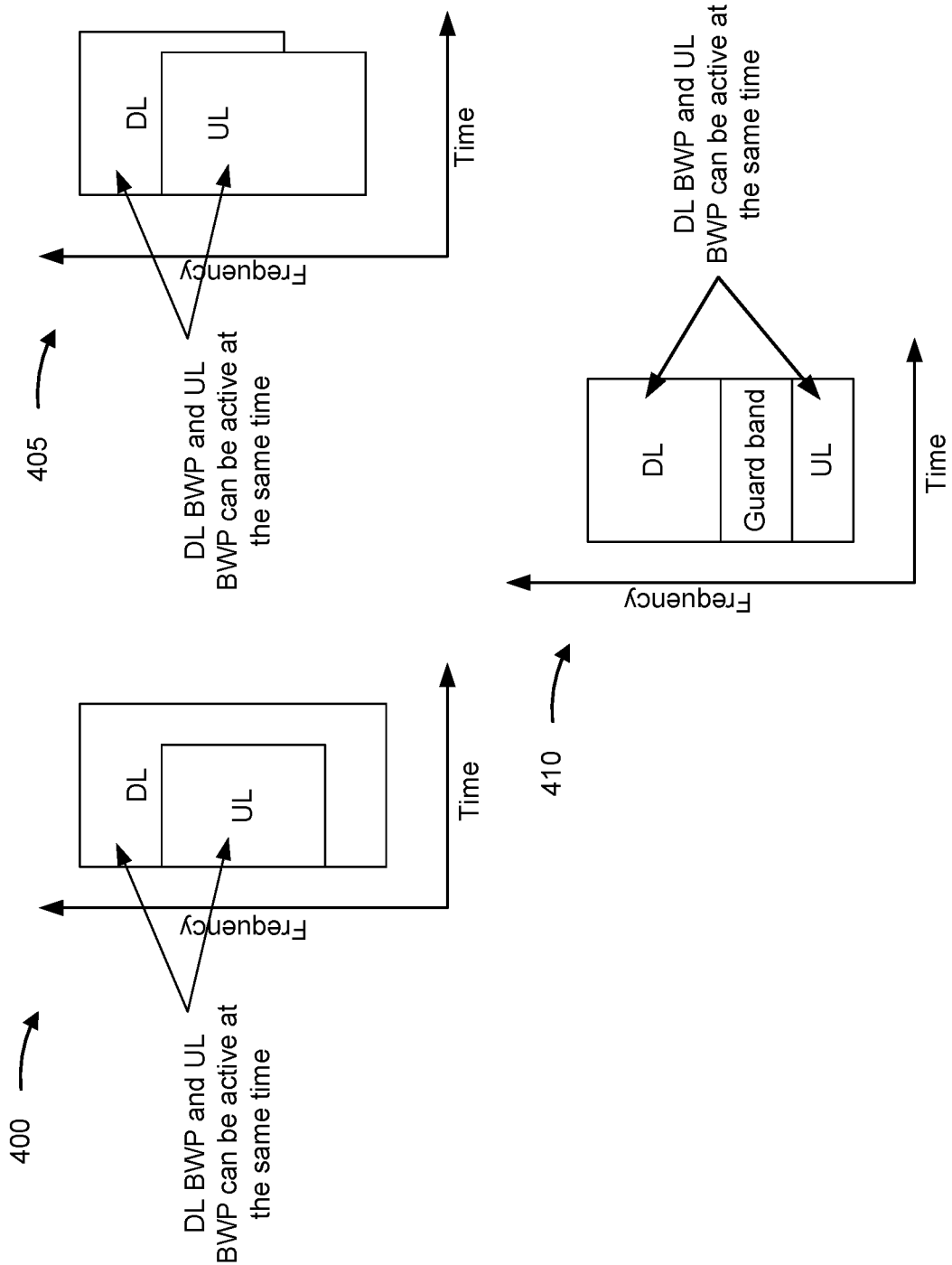
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of SBFD communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 4 is provided as an example. Other examples may differ from what is described with respect to FIG. 4.

Figure 5:
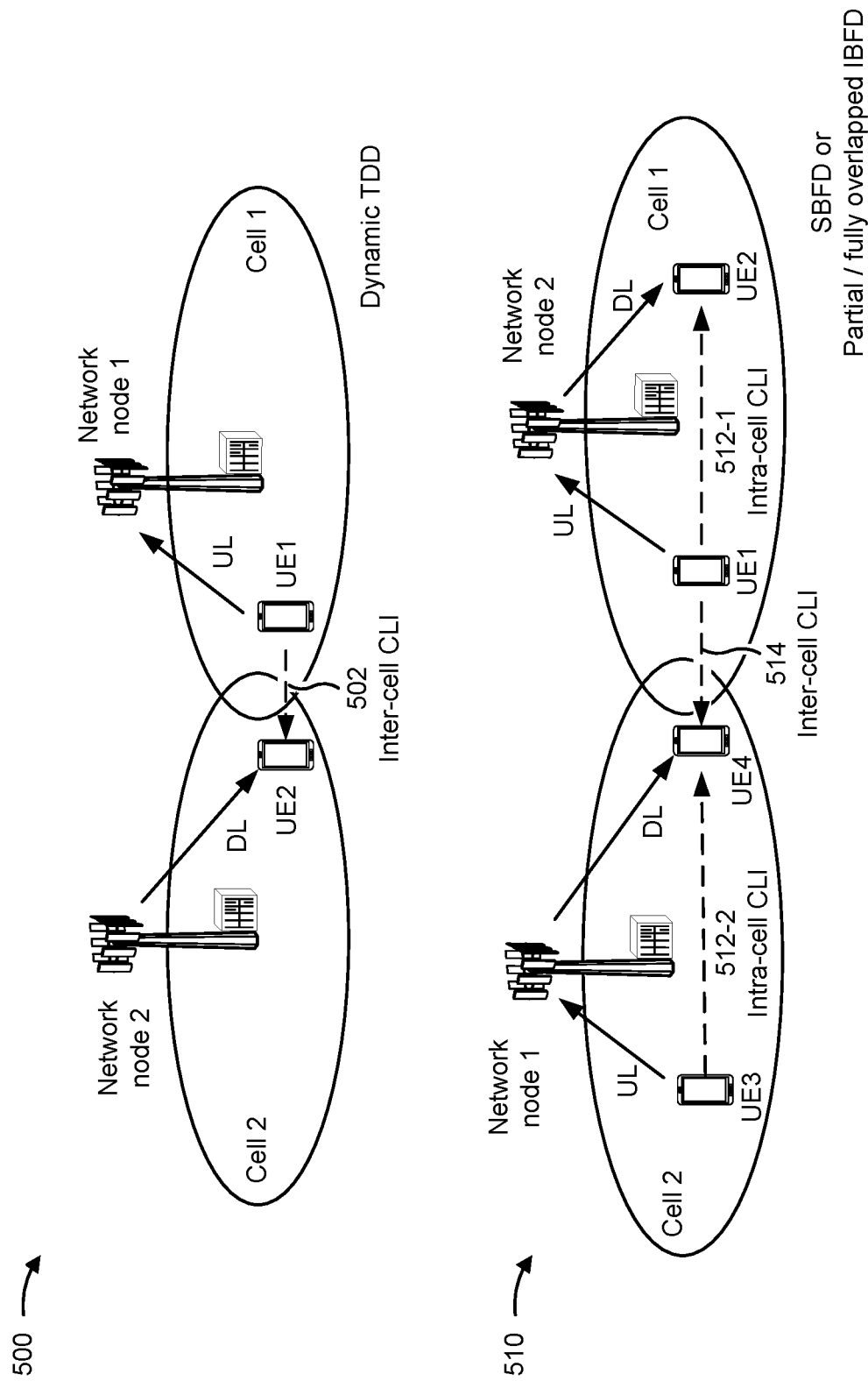
FIG. 5 is a diagram illustrating examples relating to UE-to-UE cross link interference, in accordance with the present disclosure.

FIG. 5 is a diagram illustrating examples 500 and 510 relating to UE-to-UE CLI, in accordance with the present disclosure.

SBFD combined with dynamic time division duplex (D-TDD) may allow a network node to dynamically and/or flexibly change air interface resource allocations between uplink (UL) communications and downlink (DL) communications based on a variety of factors, such as a throughput demand, a data transfer latency condition, and/or a communication prioritization. The ability to dynamically and/or flexibly change air interface resource allocations may enable the network node to concurrently service UEs with different operating conditions (e.g., a prioritization condition, a data transfer latency condition, a data throughput condition, and/or a reliability condition) in a more efficient manner relative to legacy TDD communications. However, dynamically modifying an assignment of an air interface resource (e.g., from DL to UL and/or vice versa) may result in CLI.

Example 500 shows an example of D-TDD communication. As shown in example 500, and based at least in part on D-TDD being implemented, neighboring cells (e.g., cell 1 provided by a first network node and cell 2 provided by a second network node) may use different TDD configurations to communicate with UEs, which may result in an uplink communication between a first UE (shown as UE1) and a first network node (shown as network node 1) in a same transmission time interval (TTI) as a downlink communication between a second network node (shown as network node 2) and a second UE (shown as UE2). Communications in different transmission directions (for example, DL versus UL) in the same TTI may interfere with one another, sometimes referred to as CLI. Interference with reception of a downlink communication by one UE caused by transmission of an uplink communication by another UE may be referred to as UE-to-UE CLI or inter-UE CLI.

For example, as shown by reference number 502, in the D-TDD scenario, transmission of the uplink communication in a symbol or a slot by UE1 in cell 1 may interfere with reception of the downlink communication in the symbol or the slot by UE2 in cell 2. Such interference may be referred to as inter-cell UE-to-UE CLI or inter-cell inter-UE CLI.

Example 510 shows an example of full duplex (FD) communication, such as SBFD, fully overlapping IBFD, or partial overlapping IBFD. As shown by reference number 512-1 and reference number 512-2, in an FD scenario, transmission of an uplink communication in an SBFD or IBFD slot or symbol by one UE in a cell may interfere with reception of a downlink communication in the SBFD or IBFD slot or symbol by another UE in the cell. For example, transmission of an uplink communication in an SBFD or IBFD slot or symbol by a first UE (UE1) in a first cell (cell 1) may interfere with reception of a downlink communication in the SBFD or IBFD slot or symbol by a second UE (UE2) in cell 1 as shown by reference number 512-1. As another example, transmission of an uplink communication in an SBFD or IBFD slot or symbol by a third UE (UE3) in a second cell (cell 2) may interfere with reception of a downlink communication in the SBFD or IBFD slot or symbol by a fourth UE (UE4) in cell 2 as shown by reference number 512-2. Such interference may be referred to as intra-cell UE-to-UE CLI or intra-cell inter-UE CLI. In an SBFD scenario, transmission of an uplink communication on an uplink sub-band (SB) in an SBFD symbol or slot by one UE in a cell (e.g., UE1 and/or UE3) may interfere with reception of a downlink communication on a downlink SB in the SBFD symbol or slot by another UE (e.g., UE2 and/or UE4) in the cell. Such interference may be referred to as inter-SB intra-cell UE-to-UE CLI or inter-SB intra-cell inter-UE CLI.

As shown by reference number 514, in an FD scenario, transmission of a UL communication in an SBFD or an IBFD symbol or slot by UE1 in cell 1 may interfere with reception of a DL communication in the SBFD of IBFD symbol or slot by UE4 in cell 2. Such interference may be referred to as inter-cell inter-UE CLI. In an SBFD scenario, transmission of an uplink communication on an uplink SB in an SBFD symbol or slot by UE1 in cell 1 may interfere with reception of a downlink communication on a downlink SB in the SBFD symbol or slot by UE4 in cell 2. Such interference may be referred to as inter-SB inter-cell inter-UE CLI.

As described with regard to the example 500 and the example 510, a UE may experience CLI in a DL communication (e.g., the UE may be the victim of CLI), and the CLI may be based at least in part on one or more sources (e.g., one or more aggressor UEs). To illustrate, and as described with regard to the example 510, the UE4 in cell 2 may experience intra-cell CLI that is associated with the UE3 and/or inter-cell CLI that is associated with the UE1 in cell 1. That is, the UE4 may be a victim of CLI that is associated with a first aggressor UE (e.g., the UE3) and/or a second aggressor UE (e.g., the UE1). Alternatively, or additionally, a UE may be a source of CLI to multiple UEs. For example, the UE1 in cell 1 may cause first CLI to the UE4 in cell 2 as described above and/or second CLI to UE2 in cell 1. CLI may result in degraded signal quality and/or degraded communications, such as communications that fail to satisfy a quality-of-service (QOS) condition, communications with increased recovery bit errors, communications with increased data transfer latencies, and/or communications with decreased data throughput.

Some techniques and apparatuses described herein provide interference mitigation based on UE mobility. In some aspects, a first network node may receive a first indication of an air interface resource configuration that is associated with a second network node. For example, the air interface resource configuration may indicate one or more air interface resources (e.g., characterized based at least in part on a frequency partition and/or a time partition) that the second network node has assigned to a UE for uplink communications. Based at least in part on receiving the first indication, the first network node may transmit a CLI measurement configuration that is addressed to a UE and is associated with a CLI measurement procedure at a UE. In some aspects, the CLI measurement configuration may be based at least in part on the air interface resource configuration that is associated with the second network node. To illustrate, the CLI measurement configuration may indicate to perform the CLI measurement procedure (e.g., generate a CLI metric) that is based at least in part on one or more air interface resources indicated by the air interface resource configuration that is associated with the second network node. Alternatively, or additionally, the CLI measurement configuration may be based at least in part on one or more air interface resources associated with the first network node. In some aspects, the first network node may receive a second indication of a CLI measurement report that is based at least in part on the CLI measurement configuration. Alternatively, or additionally, the first network node may perform a handover that is associated with the UE disconnecting from the first network node and/or connecting to the second network node. Performing the handover of the UE to the second network node may mitigate CLI, as described below.

In some aspects, a UE may receive, from a first network node, a CLI measurement configuration that indicates to perform a CLI measurement procedure that is based at least in part on an air interface resource configuration associated with a second network node. The UE may transmit an indication of a CLI measurement report that is based at least in part on the CLI measurement configuration. As one example, the UE may calculate a CLI metric based at least in part on an air interface resource indicated by the CLI measurement configuration, such as a CLI-RSSI metric, a sounding reference signal RSRP (SRS-RSRP) metric, and/or a CLI signal-to-interference-plus-noise ratio (CLI-SINR) metric. In some aspects, the UE may indicate the CLI metric in the CLI measurement report. The UE may perform a handover from the first network node to the second network node based at least in part on the CLI measurement report. To illustrate, the CLI metric indicated by the CLI measurement report may satisfy a trigger condition (e.g., at the UE and/or at the first network node) associated with the UE performing the handover. Accordingly, the UE may trigger a UE-initiated handover and/or may receive an instruction to perform the handover.

Based at least in part on a CLI metric, a UE may perform a mobility procedure that mitigates CLI observed by the UE and/or caused by the UE, such as a cell-level mobility procedure that is associated with a change in a network node connection at the UE and/or a beam-level mobility procedure that is associated with the UE changing a beam that is used for wireless communications. That is, the CLI metric may be associated with a condition that indicates to perform the mobility procedure. Example mobility procedures may include a network-node-initiated mobility procedure and/or a UE-initiated mobility procedure. Some non-limiting examples of mobility procedures may include the UE changing a primary cell (PCell), changing a secondary cell (SCell), changing a master cell group (MCG), changing a secondary cell group (SCG), releasing a SCell, performing a conditional handover (CHO) initiated by the UE, performing a conditional primary secondary cell (PSCell) change (CPC), performing a conditional PSCell addition (CPA), and/or changing a beam configuration used to communicate with a network node. In some aspects, the mobility procedure may result in the UE disconnecting from a first network node and/or connecting to a second network node (e.g., a cell-level mobility procedure). The change in network node connections and/or change in beam configuration may mitigate CLI experienced by the UE and/or caused by the UE based at least in part on the different network node connections using different air interface resources.

To illustrate, by transmitting a CLI measurement configuration that is associated with a CLI measurement procedure at a UE, a network node may instruct the UE to generate one or more CLI metrics associated with air interface resources associated with a second network node (e.g., a neighboring network node) and/or air interface resources associated with the first network node. In some aspects, a CLI metric may indicate that the UE performing a handover from a first network node to a second network node may mitigate CLI observed by the UE (e.g., as a victim UE) and/or caused by the UE (e.g., as an aggressor UE). For instance, in performing the handover from the first network node to the second network node, the second network node may schedule and/or assign a first air interface resource to the UE that is different from a second air interface resource scheduled and/or assigned to the UE by the first network node. The change in air interface resource assignment to the UE may result in the UE observing less CLI and/or causing less CLI at another UE. Observing less CLI and/or causing less CLI may result in an improved signal quality and/or improved communications, such as communications that satisfy a QoS condition, communications with reduced recovery bit errors, communications with reduced data transfer latencies, and/or communications with increased data throughput.

As indicated above, FIG. 5 is provided as an example. Other examples may differ from what is described with regard to FIG. 5.

Figure 6:
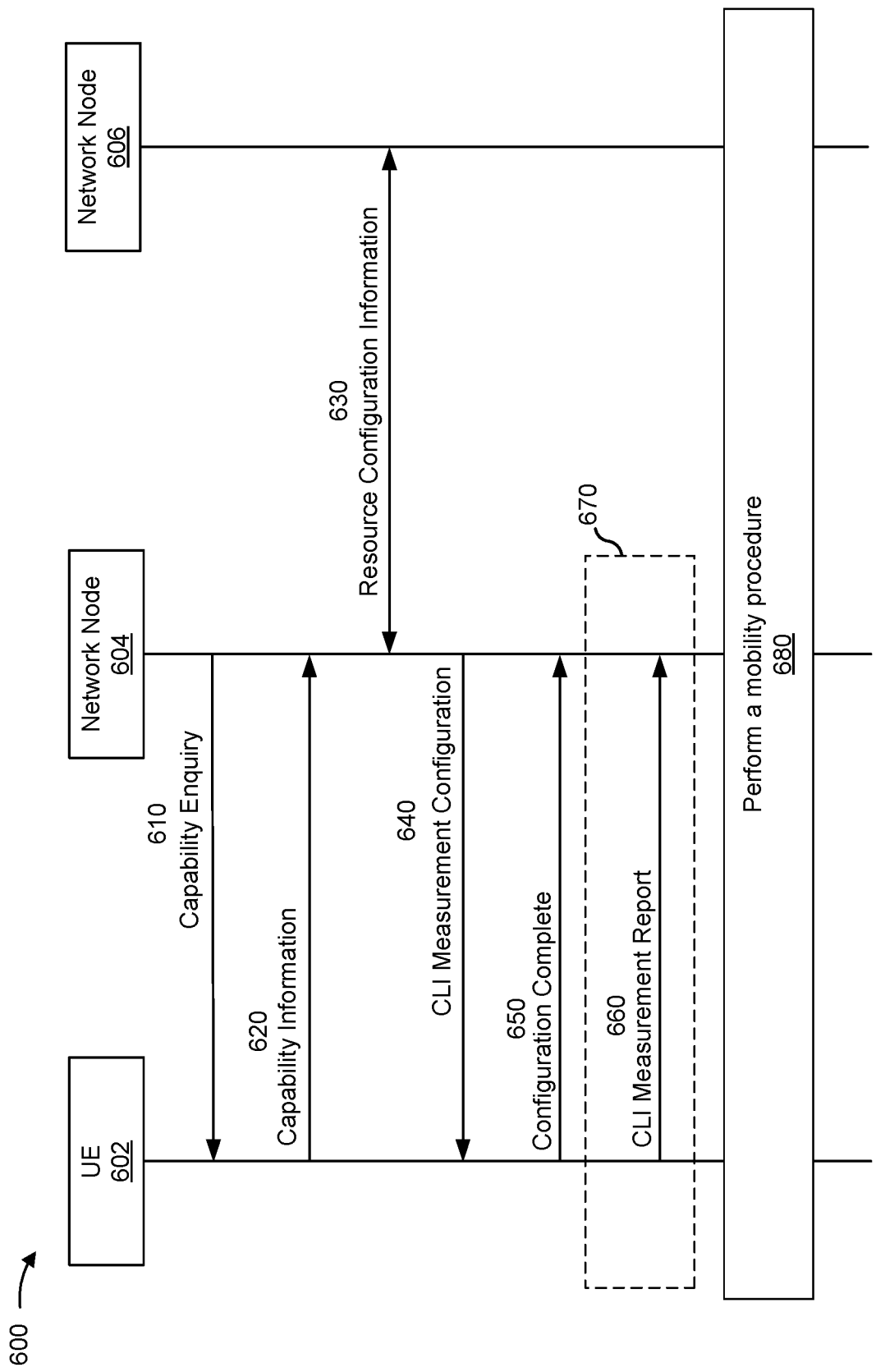
FIG. 6 is a diagram illustrating an example of a wireless communication process between a UE, a first network node, and a second network node, in accordance with the present disclosure.

FIG. 6 is a diagram illustrating an example 600 of a wireless communication process between a UE 602 (e.g., a UE 120), a first network node 604 (e.g., a first network node 110 and/or a source network node), and a second network node 606 (e.g., a second network node 110, a candidate target network node, and/or a neighbor network node to the first network node 604), in accordance with the present disclosure.

As shown by reference number 610, a first network node 604 may transmit, and a UE 602 may receive, a capability enquiry message. As one example, the first network node 604 may transmit a radio resource control (RRC) UE capability enquiry message that implicitly and/or explicitly indicates a request or CLI capability information and/or mobility procedure information that is associated with the UE 602. To illustrate, the UE capability enquiry message may indicate (e.g., explicitly and/or implicitly) a request for supported CLI measurement procedures and/or a request for supported CLI management procedures, which may be collectively referred to as CLI measurement and management procedures. Accordingly, the UE capability enquiry message may indicate a request for supported CLI measurement and management procedures. In some aspects, a mobility procedure that is associated with mitigating CLI may be alternatively referred to as a CLI management procedure. Some non-limiting examples of CLI measurement procedures may include a first CLI measurement procedure associated with generating CLI-RSSI metric, a second CLI measurement procedure associated with generating a CLI-SINR metric, and/or a third CLI measurement procedure associated with generating an SRS-RSRP metric. Some non-limiting examples of CLI management procedures may include cell-level mobility procedures and/or beam-level mobility procedures. In some aspects, the UE capability enquiry message may request information about a supported CLI measurement configuration, such as a maximum number of resources supported to perform a CLI measurement procedure, a supported measurement gap configuration (e.g., a duration and/or a measurement gap condition (e.g., enabled and/or a disabled)), first timing conditions for performing a CLI measurement procedure, and/or second timing conditions associated with reporting a CLI metric (e.g., via an CLI measurement report). Alternatively, or additionally, the UE capability enquiry message may indicate (e.g., explicitly and/or implicitly) a request for a supported mobility procedure, such as whether the UE supports any combination of a PSCell change, an SCell change, an MCG change, an SCG change, an SCell release, a CHO, a CPC, and/or a CPA.

As shown by reference number 620, the UE 602 may transmit, and the first network node 604 may receive, capability information. As one example, the UE 602 may transmit an RRC UE capability information message based at least in part on receiving the RRC UE capability enquiry message. The UE capability information May indicate any combination of a supported CLI measurement procedure, a supported measurement configuration for the CLI measurement procedure, and/or a supported CLI management procedure, examples of which are provided above. Accordingly, the UE capability information may indicate supported CLI measurement and management procedures.

In the example 600, the first network node 604 transmits a UE capability enquiry message, and the UE 602 transmits UE capability information. However, the first network node 604 and the UE 602 may transmit and/or receive alternative or additional information. To illustrate, based at least in part on establishing a wireless connection, the first network node 604 and the UE 602 may communicate via the wireless connection based at least in part on any combination of Layer 1 signaling (e.g., downlink control information (DCI) and/or uplink control information (UCI)), Layer 2 signaling (e.g., a MAC control element (CE)), and/or Layer 3 signaling (e.g., RRC signaling). For example, the first network node 604 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). That is, the first network node 604 may transmit the configuration information via Layer 3 signaling at a first point in time associated with the UE 602 being tolerant of communication delays, and the first network node 604 may transmit an activation of the configuration via Layer 2 signaling and/or Layer 1 signaling at a second point in time associated with the UE 602 being intolerant to communication delays. Alternatively, or additionally, the UE 602 may transmit, and the first network node 604 may receive, a measurement report that indicates a first measurement metric associated with the first network node 604 and/or a second measurement metric associated with the second network node. Accordingly, the first network node 604 and/or the UE 602 may communicate with one another using any combination of Layer 1 signaling, Layer 2 signaling, and/or Layer 3 signaling for any combination of messages as described herein.

As shown by reference number 630, the first network node 604 may transmit, and the second network node 606 may receive, resource configuration information that is associated with the first network node 604. Alternatively, or additionally, the second network node 606 may transmit, and the first network node may receive, resource configuration information that is associated with the second network node 606. To illustrate, the first network node 604 may indicate first resource configuration information that is associated with an SBFD communication and/or a D-TDD communication in a first cell provided by the first network node 604. For example, the first resource configuration information may indicate a time partition (e.g., a time slot, a mini-slot, a starting symbol, an ending symbol, and/or a number of symbols), a frequency partition (e.g., a frequency band and/or frequency a sub-band), a resource element (RE), and/or a communication direction (e.g., DL and/or UL) that is associated with the SBFD communication and/or the D-TDD communication assigned to a UE in a first cell 1 provided by the first network node 604. Alternatively, or additionally, the second network node 606 may indicate second resource configuration information that is associated with an SBFD communication and/or a D-TDD communication assigned to a UE in a second cell provided by the second network node 606. The first resource configuration information and/or the second resource configuration information may be associated with potential sources of CLI as identified by the respective network node. Accordingly, the first network node 604 and/or the second network node 606 may perform an inter-cell CLI resource coordination procedure that is associated with transmitting and/or receiving resource configuration information that is associated with potential inter-cell CLI.

The transmission of the resource configuration information by the first network node 604 may implicitly indicate a request for resource configuration information that is associated with the second network node 606. Alternatively, or additionally, the first network node 604 may transmit an explicit request for the resource configuration information that is associated with the second network node 606. In some aspects, the first network node 604 may transmit the resource configuration information and/or a request for the resource configuration information based at least in part on receiving a measurement report from the UE 602. For example, the measurement report may indicate that the UE 602 measured a signal from the second network node 606 that satisfies a strong signal threshold, and the first network node 604 may identify the second network node 606 as a candidate network node for a mobility procedure with the UE 602 (e.g., a cell-level mobility procedure and/or a beam-level mobility procedure). Alternatively, or additionally, the second network node 606 may be a neighbor network node that satisfies a distance threshold to the first network node and includes capabilities to support the mobility procedure with the UE and/or an SBFD capable network node.

In some aspects, the first network node 604 and/or the second network node 606 may select the resource configuration information to indicate to the other network node based at least in part on a location of an associated UE. For instance, the first network node 604 may indicate first resource configuration information that is associated with a first UE that is located within a threshold of a boundary between the first network node 604 and the second network node 606, and/or refrain from indicating second resource configuration information that is associated with a second UE that is located outside of the threshold (or vice versa for the second network node 606).

As shown by reference number 640, the first network node 604 may transmit, and the UE 602 may receive, an indication of a CLI measurement configuration. As one example, the first network node 604 may indicate at least part of the CLI measurement configuration in an RRC reconfiguration message. In some aspects, the CLI measurement configuration may indicate one or more CLI measurement procedures and/or one or more CLI metrics. That is, the CLI measurement configuration may indicate to generate a CLI metric (e.g., CLI-RSSI, SRS-RSRP, and/or CLI-SINR) based at least in part on performing a CLI measurement procedure. Alternatively, or additionally, the CLI measurement configuration may indicate one or more CLI measurement air interface resources (e.g., one or more air interface resources to use in generating the CLI metric). In some aspects, the CLI measurement configuration may indicate to perform the CLI measurement procedure and/or to generate the CLI metric periodically, while in other aspects, the CLI measurement configuration may indicate to perform the CLI measurement procedure and/or to generate the CLI metric aperiodically.

To illustrate, based at least in part on resource configuration information indicated by the second network node 606, the first network node 604 may indicate, via the CLI measurement configuration, a CLI measurement air interface resource that is based at least in part on an air interface resource indicated by the second network node 606. In some aspects, the second network node 606 may be a candidate target network node for the UE 602 (e.g., to perform a handover with), a neighbor network node of the first network node 604 (e.g., a potential source of CLI), and/or a network node that supports SBFD communications (e.g., a potential source of CLI). As one example, the CLI measurement air interface resource may be associated with an SBFD communication and/or a D-TDD communication in a cell provided by the second network node 606. As another example, the second network node 606 may be a candidate target network node, and the CLI measurement air interface resource may be associated with an air interface resource available for assignment to the UE 602 (e.g., based at least in part on performing a handover). By selecting and/or indicating to perform a CLI measurement procedure based at least in part on a CLI measurement air interface resource that is associated with the second network node 606, the first network node 604 may configure the UE 602 to generate a CLI metric that indicates whether the UE 602 is a victim of CLI that is associated with a communication in the second cell provided by the second network node 606 and/or whether the second network node 606 satisfies a condition to be a target network node to the UE 602. For instance, a first CLI metric calculated by the UE 602 that satisfies a high threshold may indicate that the UE 602 is a victim UE of communications associated with the second network node 606, and a second CLI metric that fails to satisfy the high threshold may indicate that the UE 602 is not a victim UE of the communications that are based at least in part on the second network node 606. Alternatively, or additionally, the first CLI metric satisfying the high threshold may indicate that the second network node 606 fails to satisfy the condition to be the target network node, and the second CLI metric failing to satisfy the high threshold may indicate that the second network node 606 satisfies the condition to be the target network node.

In some aspects, a CLI measurement air interface resource indicated by the CLI measurement configuration may be located within an active DL bandwidth part (BWP) of the UE 602. Alternatively, or additionally, a CLI measurement air interface resource indicated by the CLI measurement configuration may be located outside of the active DL BWP. At least a portion of the CLI measurement configuration may indicate a measurement gap configuration (e.g., a duration and/or an enabled state) associated with calculating a CLI metric. As one example, the first network node 604 may select a duration for a measurement gap based at least in part on UE capabilities. To illustrate, a first UE may indicate a minimum duration that the first UE supports for a measurement gap, and/or a second UE may indicate support for generating a CLI metric without the use of a measurement gap (e.g., the UE supports a measurement gap duration of zero). Accordingly, the first network node 604 may indicate, via at least part of the CLI measurement configuration, a duration for a measurement gap and/or an enabled state (e.g., enabled or disabled) of the measurement gap.

Alternatively, or additionally, the CLI measurement configuration may indicate to generate a CLI metric and/or to perform a CLI measurement procedure based at least in part on an uplink transmission (e.g., by another UE). For instance, the CLI measurement configuration may indicate to perform the CLI measurement procedure based at least in part on a PRACH transmission (e.g., that is based at least in part on a physical downlink control channel (PDCCH) ordered random access channel (RACH) message), a sounding reference signal (SRS) transmission, a physical uplink control channel (PUCCH) transmission, and/or a physical uplink shared channel (PUSCH) transmission. For instance, the CLI measurement configuration may indicate, as a CLI measurement air interface resource, one or more air interface resources associated with the uplink transmission.

In some aspects, the first network node 604 may select a measurement gap configuration based at least in part on one or more characteristics associated with the CLI measurement air interface resource. As one example, based at least in part on the CLI measurement air interface resource being associated with a different reference numerology (e.g. a numerology associated with subcarrier spacing (SCS) and/or cyclic prefix (CP) of an OFDM symbol) than an active DL BWP assigned to the UE 602, the first network node 604 may determine to enable the use of a measurement gap and/or select a duration for the measurement gap (e.g., based at least in part on a UE capability). For instance, the UE 602 may be operating based at least in part on an active DL BWP configured by the first network node 604 and is associated with a first SCS (e.g., SCS 60 kilohertz (kHz)), and the first network node 604 may configure the UE 602 to generate a CLI metric that is based at least in part on a second SCS (e.g., 240 kHz). In some aspects, the second SCS may be associated with an UL communication between another UE and the second network node 606, such as an SRS, a PRACH, a PUSCH transmission, and/or a PUCCH transmission. Alternatively, or additionally, the first network node 604 may enable the use of the measurement gap and/or select a duration for the measurement gap based at least in part on a first bandwidth (BW) that is associated with a CLI measurement air interface resource being outside of the active DL BWP associated with the UE 602 (e.g., the CLI measurement air interface resource does not overlap with the active DL BWP).

The first network node 604 may indicate, as at least part of the CLI measurement configuration, one or more thresholds (e.g., a single threshold or a set of thresholds) and/or one or more offsets (e.g., a single offset and/or a set of offsets) that are associated with a CLI metric. To illustrate, the first network node 604 may indicate a threshold and/or an offset that is associated with the UE 602 determining whether to perform a CHO, whether to request release of an SCell, whether to request a change in a PSCell (e.g., a CPC), and/or whether to add a PSCell (e.g., a CPA). As one example, the first network node 604 may include one or more CLI fields in an RRC message (e.g., an RRC reconfiguration message), and each CLI field may be associated with a respective conditional mobility procedure associated with the UE 602, such as a first CLI field that is associated with a CHO, a second CLI field that is associated with a CPC, a third CLI field that is associated with a CPA, and/or a fourth CLI field that is associated with requesting release of an SCell. Each CLI field may indicate a respective threshold and/or offset that may be used by the UE 602 to make a determination on whether to request the respective conditional mobility procedure. That is, the first network node 604 may configure a conditional mobility procedure at the UE 602 based at least in part on a CLI field and/or a CLI metric. Accordingly, the first network node 604 may indicate a trigger condition for performing a mobility procedure based at least in part on indicating a threshold associated with a CLI metric (e.g., a CLI threshold) and/or an offset associated with the CLI metric (e.g., a CLI offset)

The CLI measurement configuration may include and/or indicate a CLI reporting configuration. For instance, the CLI measurement configuration may indicate, by way of the CLI reporting configuration, to generate and/or transmit periodic CLI measurement reports (e.g., that include one or more CLI metrics). Alternatively, or additionally, the CLI measurement configuration may indicate, by way of the CLI reporting configuration, to generate and/or transmit an aperiodic CLI measurement report. To illustrate, the CLI reporting configuration may specify a reporting trigger event that is associated with the UE 602 transmitting the aperiodic CLI measurement report, such as a reporting trigger event that is associated with a CLI metric satisfying a first threshold and/or failing to satisfy a second threshold. In some aspects, the CLI reporting configuration may indicate the first threshold and/or the second threshold.

In some aspects, the CLI measurement configuration and/or the CLI reporting configuration included in the CLI measurement configuration may indicate an allocation of one or more air interface resources for transmitting a periodic CLI measurement report and/or an aperiodic CLI measurement report. That is, the first network node 604 may schedule transmission of a periodic CLI measurement report and/or an aperiodic CLI measurement report. As one example, the CLI measurement report may indicate semi-persistent scheduling (SPS) and/or a configured grant (CG). Alternatively, or additionally, the UE 602 may request an allocation for transmitting a CLI measurement report (e.g., based at least in part on a scheduling request UE assistance information (UAI)) as described below with regard to FIG. 7.

The first network node 604 may transmit the CLI measurement configuration and/or the CLI reporting configuration in any combination of Layer 1 signaling (e.g., DCI), Layer 2 signaling (e.g., a MAC CE), and/or Layer 3 signaling (e.g., RRC signaling). As one example, the allocation of air interface resource(s) to the UE 602 (e.g., for transmitting a CLI measurement report) may be indicated in Layer 1 signaling and/or Layer 2 signaling, and an indication of a CLI measurement air interface resource and/or a CLI measurement procedure may be indicated in Layer 3 signaling. Accordingly, the first network node 604 may partition and/or transmit the CLI measurement configuration in multiple transmissions. Alternatively, or additionally, the first network node 604 may transmit the CLI measurement configuration in a single transmission. In some aspects, the first network node 604 may transmit at least part of the CLI measurement configuration in an RRC reconfiguration message.

As shown by reference number 650, the UE 602 may transmit, and the first network node 604 may receive, an indication that processing of the CLI measurement configuration has completed. To illustrate, the UE 602 may transmit an RRC reconfiguration complete message that is associated with an RRC reconfiguration message transmitted by the first network node 604.

As shown by reference number 660, the UE 602 may transmit, and the first network node 604 may receive, a CLI measurement report (and/or a CLI metric). In some aspects, the UE 602 may periodically transmit a CLI measurement report based at least in part on a resource allocation indicated by the CLI measurement configuration (e.g., an SPS grant). Alternatively, or additionally, the UE 602 may transmit an aperiodic CLI measurement report based at least in part on a CG. In some aspects, the UE 602 may transmit an aperiodic CLI measurement report.

The signaling transactions shown by reference number 670 may include alternative or additional signaling transactions. As one example, and as described with regard to FIG. 7 below, the signaling transactions may include one or more signaling transactions associated with the UE 602 transmitting an indication of an allocation request for transmitting an aperiodic CLI measurement report.

As shown by reference number 680, the UE 602, the first network node 604, and/or the second network node 606 may perform a mobility procedure, such as a cell-level mobility procedure (e.g., a handover of the UE 602 from the first network node 604 to the second network node 606 as shown in FIG. 6) and/or a beam-level mobility procedure. As one example, the UE 602, the first network node 604, and the second network node 606 may perform a handover of the UE 602 to the second network node 606. In performing the handover, the UE 602 may dismantle and/or tear down a first communication link with the first network node 604 (e.g., a source network node) and/or establish a second communication link with the second network node 606 (e.g., a target network node). Alternatively, or additionally, the first network node 604 may transmit a mobility request message (e.g., to the second network node) that indicates a CLI trigger event associated with performing a cell-level mobility procedure and/or a beam-level mobility procedure with the UE 602. In performing a beam-level mobility procedure, the UE 602 may change from communicating with the first network node 604 using a first beam to communicating with the first network node 604 and/or the second network node 606 using a second beam.

Based at least in part on a CLI metric, a UE may perform a mobility procedure that mitigates CLI observed by the UE and/or caused by the UE. In performing the handover from the first network node to the second network node, the second network node may schedule and/or assign different air interface resources to the UE relative to air interface resources scheduled and/or assigned by the first network node. The different air interface resources may result in the UE observing less CLI and/or generating less CLI at another UE. Observing less CLI and/or generating less CLI may result in an improved signal quality and/or improved communications, such as communications that satisfy a QoS condition, communications with reduced bit errors, communications with reduced data transfer latencies, and/or communications with increased data throughput.

As indicated above, FIG. 6 is provided as an example. Other examples may differ from what is described with regard to FIG. 6.

Figure 7:
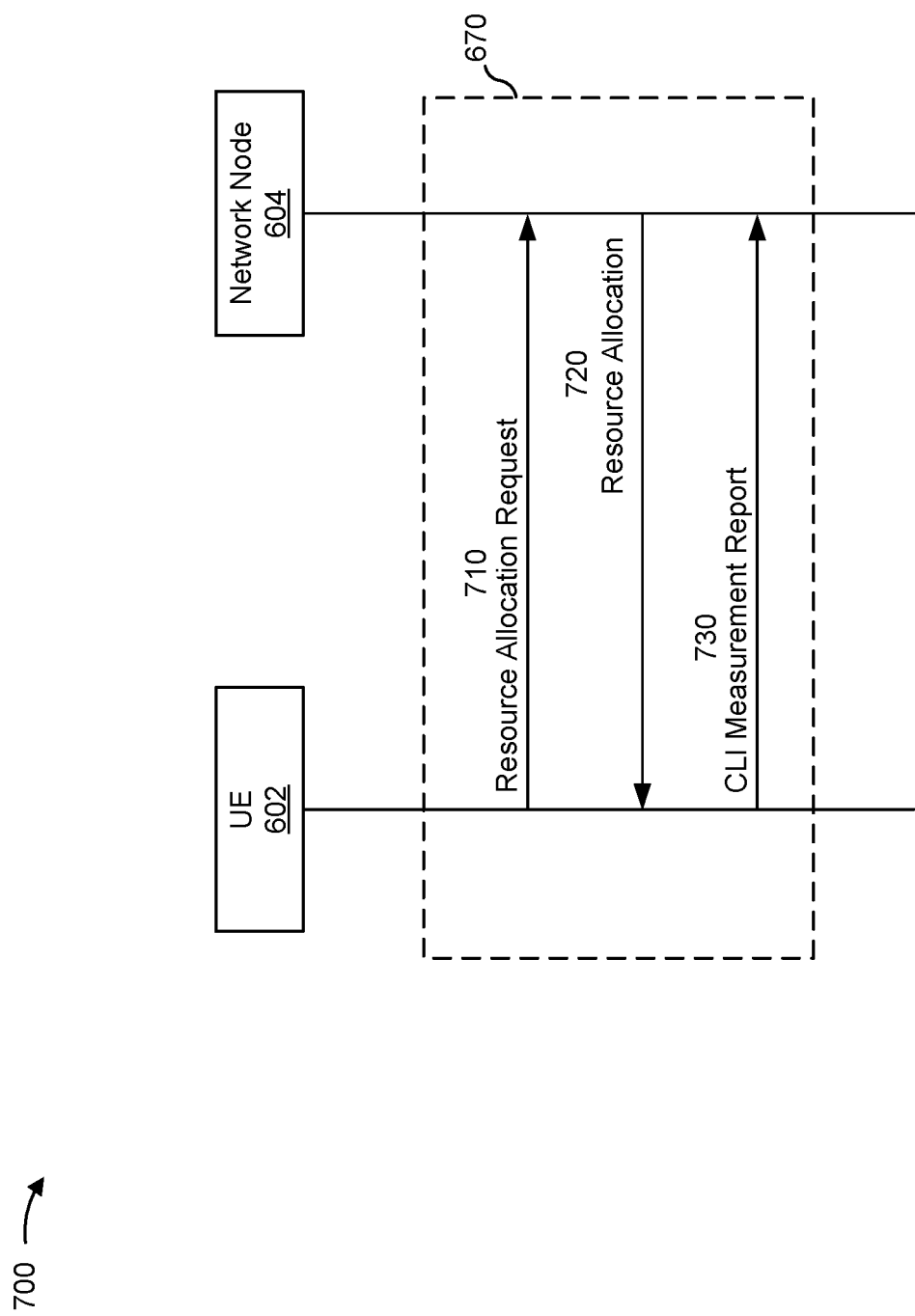
FIG. 7 is a diagram illustrating an example of a wireless communication process between a UE and a network node, in accordance with the present disclosure.

FIG. 7 is a diagram illustrating an example 700 of a wireless communication process between a UE (e.g., the UE 602 as described with regard to FIG. 6) and a network node (e.g., the first network node 604 as described with regard to FIG. 6), in accordance with the present disclosure. As shown by reference number 670, one or more of the signaling transactions included in the example 700 may be combined with one or more aspects of the example 600 described with regard to FIG. 6.

As shown by reference number 710, the UE 602 may transmit, and the first network node 604 may receive, a resource allocation request. To illustrate, the UE 602 may explicitly transmit a resource allocation request based at least in part on transmitting a scheduling request. As another example, the UE 602 may implicitly transmit the resource allocation request based at least in part on transmitting UAI. In some aspects, the UE 602 may transmit the resource allocation request based at least in part on determining to transmit a CLI measurement report and/or a CLI metric (e.g., an aperiodic CLI measurement report that includes the CLI metric). For instance, the UE 602 may detect a reporting trigger event as described with regard to FIG. 6, such as a reporting trigger event associated with the CLI metric satisfying a threshold. Based at least in part on detecting the reporting trigger event, the UE 602 may transmit the resource allocation request.

As shown by reference number 720, the first network node 604 may transmit, and the UE 602 may receive, an indication of a resource allocation assigned to the UE 602. For example, the first network node 604 may indicate a resource allocation that is associated with a physical uplink shared channel (PUSCH) resource allocation.

As shown by reference number 730, the UE 602 may transmit, and the first network node 604 may receive, a CLI measurement report based at least in part on the resource allocation. For instance, the UE 602 may transmit the CLI measurement report based at least in part on the PUSCH resource allocation.

As indicated above, FIG. 7 is provided as an example. Other examples may differ from what is described with regard to FIG. 7.

Figure 8:
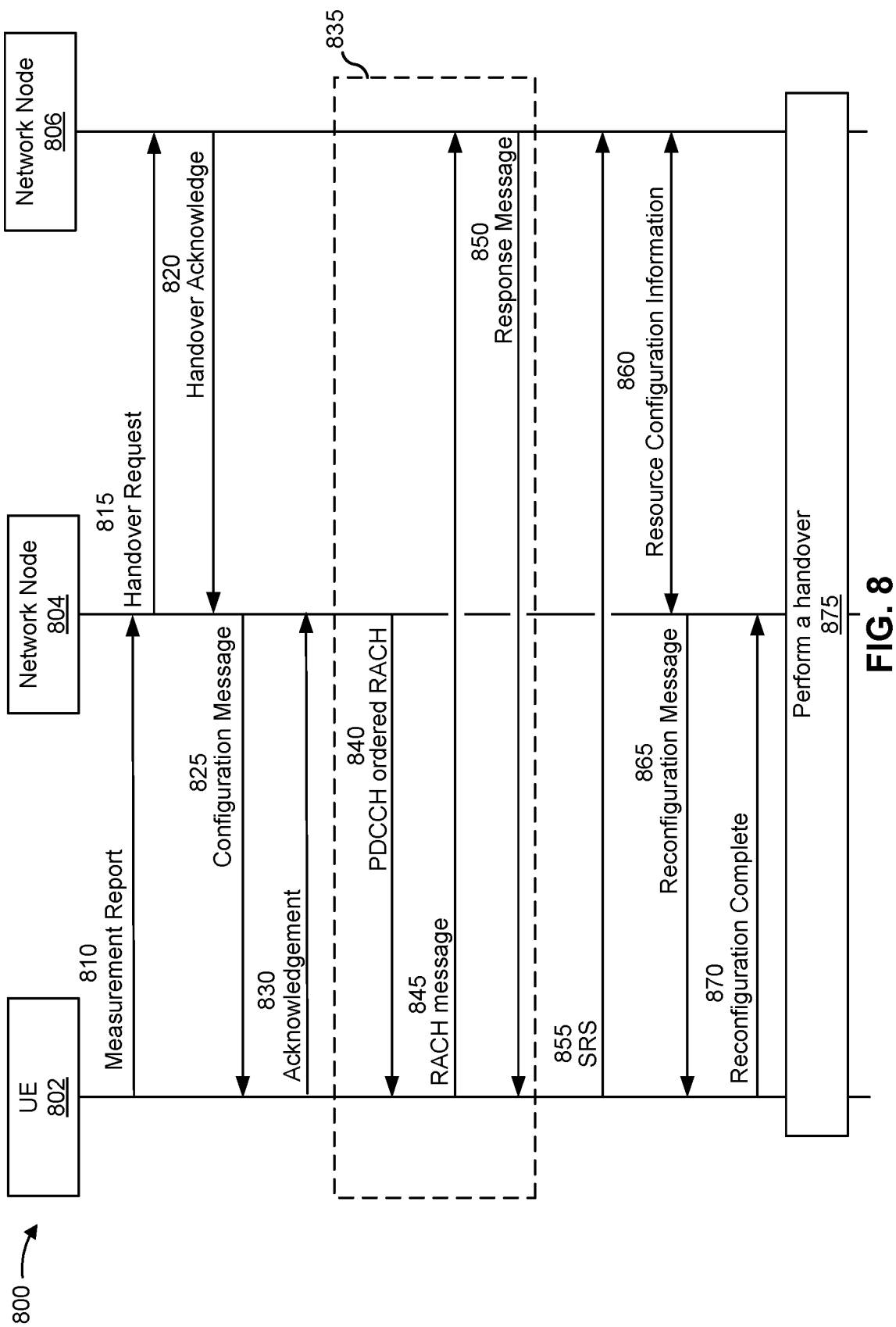
FIG. 8 is a diagram illustrating an example of a wireless communication process between a UE, a first network node, and a second network node, in accordance with the present disclosure.

FIG. 8 is a diagram illustrating an example 800 of a wireless communication process between a UE 802 (e.g., a UE 120), a first network node 804 (e.g., a first network node 110 and/or a source network node), and a second network node 806 (e.g., a second network node 110 and/or a target network node), in accordance with the present disclosure. One or more of the signaling transactions included in the example 800 may be combined with one or more aspects of the example 600 as described with regard to FIG. 6 and/or the example 700 as described with regard to FIG. 7.

Prior to performing a handover from a source network node to a target network node, a UE may transmit an SRS based at least in part on using one or more air interface resources that are associated with the target network node. Early transmission of the SRS (e.g., an SRS transmission that occurs prior to performing the handover to the target network node using an air interface resource of the target network node) may mitigate QoS degradation (e.g., a failure to meet a QoS condition) and/or service interruption that is caused by CLI after the UE switches to the target network node, such as by mitigating the switching UE becoming an aggressor UE to other UEs serviced by the target network node. For example, an SRS air interface resource associated with the target network node and/or SRS configuration information may be configured (e.g., RRC configured) for the switching UE prior to performing the handoff, and UEs connected to the target network node may generate one or more CLI metrics that are based at least in part on the SRS transmission. An SRS configuration may indicate any combination of an SRS resource configuration and/or an SRS transmission scheme. To illustrate, an SRS resource configuration may indicate time-frequency mapping information associated with transmission of an SRS, and an SRS transmission scheme may indicate any combination of a transmission beam associated with transmission of an SRS, a periodicity associated with the transmission of the SRS, and/or a time associated with the transmission of the SRS.

Alternatively, or additionally, UEs connected to the source network node may generate one or more CLI metrics that are based at least in part on the SRS transmission. The CLI metrics associated with the SRS transmission may provide an indication of how the switching UE performing a handoff to the target network node may affect CLI in the associated target cell provided by the target network node and/or CLI in a source cell provided by the source network node based at least in part on the switching UE connecting to the target network node. In some aspects, early SRS transmission may enable the target network node to perform various procedures that assist the mobility of the switching UE (e.g., optimize cell reselection), such as a positioning procedure, a tracking area tracking procedure, and/or a power control and channel sounding procedure. Accordingly, early SRS transmission by a switching UE may enable interference management, link adaptation to mitigate interference, and/or network energy savings.

As shown by reference number 810, a UE 802 may transmit, and a first network node 804 may receive, a measurement report. In some aspects, the measurement report may be a CLI measurement report as described with regard to FIG. 6 and/or FIG. 7. Alternatively, or additionally, the measurement report may include other signal metrics, such as a candidate cell signal metric (e.g., RSSI) that is associated with a downlink signal transmitted by the second network node 806.

As shown by reference number 815, the first network node 804 may transmit, and a second network node 806 may receive, a handover request. As one example, the first network node 804 may analyze the measurement report, such as by comparing a CLI metric included in the CLI measurement report to a first threshold and/or by comparing a candidate cell signal metric to a second threshold. The first network node 804 may determine, based at least in part on analyzing the measurement report, to perform a handoff of the UE 802 to the second network node 806. Accordingly, and based at least in part on determining to perform a handoff of the UE 802 to the second network node 806, the first network node 804 may transmit a handover request to the second network node 806 that indicates a request to perform the handover of the UE 802 to the second network node 806. The handover request may include any combination of UE capability information, QoS information, RRC context information (e.g., a data radio bearer configuration, a security configuration, and/or measurement reporting configuration), and/or UE context information (e.g., a subscription permanent identifier, a 5G globally unique identifier, a mobile equipment identity, a UE mobility management capability, and/or an event subscription).

As shown by reference number 820, the second network node 806 may transmit, and the first network node 804 may receive, a handover acknowledgement. In some aspects, the handover acknowledgement may indicate that the second network node 806 confirms the handover of the UE 802 and/or agrees to admit the UE 802. The handover acknowledgement may include connection information (e.g., RRC connection reconfiguration information and/or bearer setup information) that may be used by the UE 802 to establish a connection with the second network node 806.

As shown by reference number 825, the first network node 804 may transmit, and the UE 802 may receive, a configuration message. In some aspects, the configuration message may include the RRC connection reconfiguration information indicated by the second network node 806 as described with regard to reference number 820. Accordingly, the configuration message may include configuration information associated with the second network node 806, such as configuration information that is associated with a downlink transmission (e.g., a synchronization signal block (SSB) and/or a PDCCH) by the second network node 806 and/or configuration information that is associated with an uplink transmission to the second network node 806 (e.g., an SRS and/or a PRACH). As shown by reference number 830, the UE 802 may transmit, and the first network node 804 may receive, an acknowledgement that is associated with the configuration message.

In some aspects, early SRS transmission by the UE 802 may be based at least in part on a timing advance (TA) that is associated with the second network node 806. "Timing advance" may denote a value that is used to control a timing of an uplink transmission by a UE (e.g., the UE 802) such that the uplink transmission is received by a network node (e.g., the second network node 806) at a time that aligns with an internal timing of the network node. The signaling transactions shown by reference number 835 are example signaling transactions that may be transmitted and/or received by the UE 802, the first network node 804, and/or the second network node 806 to obtain a value for a TA that may be used by the UE 802 to transmit an early SRS to the second network node 806.

The signaling transactions shown by reference number 835 provide an example of signaling transactions that are associated with a PDCCH ordered RACH. However, in other examples, the UE 802 may obtain a value for a TA without performing a PDCCH ordered RACH. As one example, the UE 802 may reuse a valid TA that is associated with the first network node 804 (e.g., a source network node) to transmit the SRS to the second network node 806. Alternatively, or additionally, the UE 802 may use a calculated TA that is based at least in part on the UE 802 combining the valid TA with a timing difference (e.g., indicated by the first network node 804). As a second example, the first network node 804 may perform a positioning procedure to estimate a position of the UE 802. Based at least in part on the estimated position of the UE 802, the first network node 804 may calculate the TA based at least in part on an estimated propagation delay that is associated with a first position of the UE 802 and a second position of the second network node 806. The first network node 804 may indicate the TA in the configuration message as described with regard to reference number 825, or in other messages (e.g., Layer 1 signaling, Layer 2 signaling, and/or Layer 3 signaling). As a third example, the UE 802 may obtain TA information based at least in part on another network, such as global navigation satellite system (GNSS) and/or another RAT. Accordingly, the signaling transactions shown by reference number 835 provide a non-limiting example of the UE 802 obtaining a TA that may be used for early SRS transmission.

As shown by reference number 840, the first network node 804 may transmit, and the UE 802 may receive, a PDCCH order (e.g., a PDCCH ordered RACH message) that instructs the UE 802 to perform a RACH procedure with the second network node 806. As one example, the first network node 804 may transmit the PDCCH order in downlink control information (DCI). The PDCCH order may indicate to perform a four-step RACH procedure and/or a two-step RACH procedure. Alternatively, or additionally, the PDCCH order may indicate information that is associated with the second network node 806, such as a cell identifier (ID), a BWP ID, and/or a RACH resource configuration associated with the second network node 806. In some aspects, the first network node 804 may transmit an activation indication (e.g., within the DCI as part of the PDCCH order) that indicates to activate transmission of an SRS to the second network node 806. However, in other examples, the first network node 804 may transmit the activation indication in a separate PDCCH transmission. In some aspects, an SRS configuration associated with transmission of the SRS to the second network node 806 may be indicated in RRC signaling (e.g., prior to transmission of the PDCCH order), such as in part of the configuration message as described with regard to reference number 825 or in a separate RRC message, and the activation indication may be transmitted in Layer 1 signaling and/or Layer 2 signaling.

As shown by reference number 845, the UE 802 may transmit, and the second network node 806 may receive, a random access message. In a two-step RACH procedure (shown by FIG. 8), the random access message may be referred to as message A, msgA, a first message, or an initial message. Furthermore, in some aspects, the first random access preamble may be referred to as a message A preamble, a msgA preamble, a preamble, or a PRACH preamble, and the RAM payload may be referred to as a message A payload, a msgA payload, or a payload. In some aspects, the random access message may include some or all of the contents of message 1 (msg1) and message 3 (msg3) of a four-step RACH procedure. In a four-step RACH procedure, the random access message may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 850, the second network node 806 may transmit, and the UE 802 may receive, a response message. In some aspects, the response message may be a second step of the two-step random access procedure. In some aspects, the response message may be a random access response (RAR) message that is alternatively, or additionally, referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information. In some aspects, the second network node 806 may transmit, as at least part of the response message, an activation indication that specifies to activate an SRS transmission. As one example, the second network node 806 may transmit the activation indication in a MAC CE that is associated with transmission of the response message. In other examples, the first network node 804 may transmit the activation indication in a separate MAC CE.

As shown by reference number 855, the UE 802 may transmit, and the second network node 806 may receive, an SRS. For example, the UE 802 may transmit the SRS based at least in part on a TA indicated in the response message as described with regard to reference number 850. Alternatively, or additionally, the UE 802 may transmit the SRS based at least in part on an SRS configuration (e.g., one or more SRS air interface resources). The UE 802 may autonomously transmit the SRS based at least in part on receiving the response message and/or the UE 802 may transmit the SRS based at least in part on receiving an activation indication.

As shown by reference number 860, the first network node 804, and the second network node 806 may receive first resource configuration information that is associated with the first network node 804. Alternatively, or additionally, the second network node 806 may transmit, and the first network node may receive, second resource configuration information that is associated with the second network node 806. For instance, and in a similar manner as described with regard to reference number 630, the first resource configuration information and/or the second resource configuration information may indicate respective air interface resources that are associated with an SBFD communication and/or a D-TDD communication.

As shown by reference number 865, the first network node 804 may transmit, and the UE 802 may receive, a reconfiguration message. As one example, the reconfiguration message may be an RRC reconfiguration message that indicates one or more configurations associated with performing a handover to the second network node 806.

As shown by reference number 870, the UE 802 may transmit, and the first network node 804 may receive, a reconfiguration complete message. For instance, the reconfiguration complete message may be an RRC reconfiguration complete message.

As shown by reference number 875, the UE 802, the first network node 804, and/or the second network node 806 may perform a handover of the UE 802 from the first network node 804 to the second network node 806. In performing the handover, the UE 802 may dismantle and/or tear down a first communication link with the first network node 804 (e.g., a source network node) and/or establish a second communication link with the second network node 806 (e.g., a target network node).

Based at least in part on a CLI metric, a UE may perform a mobility procedure that mitigates CLI observed by the UE and/or caused by the UE. In performing the handover from the first network node to the second network node, the second network node may schedule and/or assign different air interface resources to the UE relative to air interface resources scheduled and/or assigned by the first network node. Early SRS transmission may mitigate QoS degradation and/or service interruption that is caused by CLI after the UE switches to the target network node, such as by mitigating the switching UE to become an aggressor UE to other UEs serviced by the target network node. Alternatively, or additionally, early SRS transmission may enable the target network node to perform various procedures that assist the mobility of the switching UE (e.g., optimize cell reselection), such as a positioning procedure, a tracking area tracking procedure, and/or a power control and channel sounding procedure. Accordingly, early SRS transmission by a switching UE may enable interference management, link adaptation, and/or network energy savings.

As indicated above, FIG. 8 is provided as an example. Other examples may differ from what is described with regard to FIG. 8.

Figure 9:
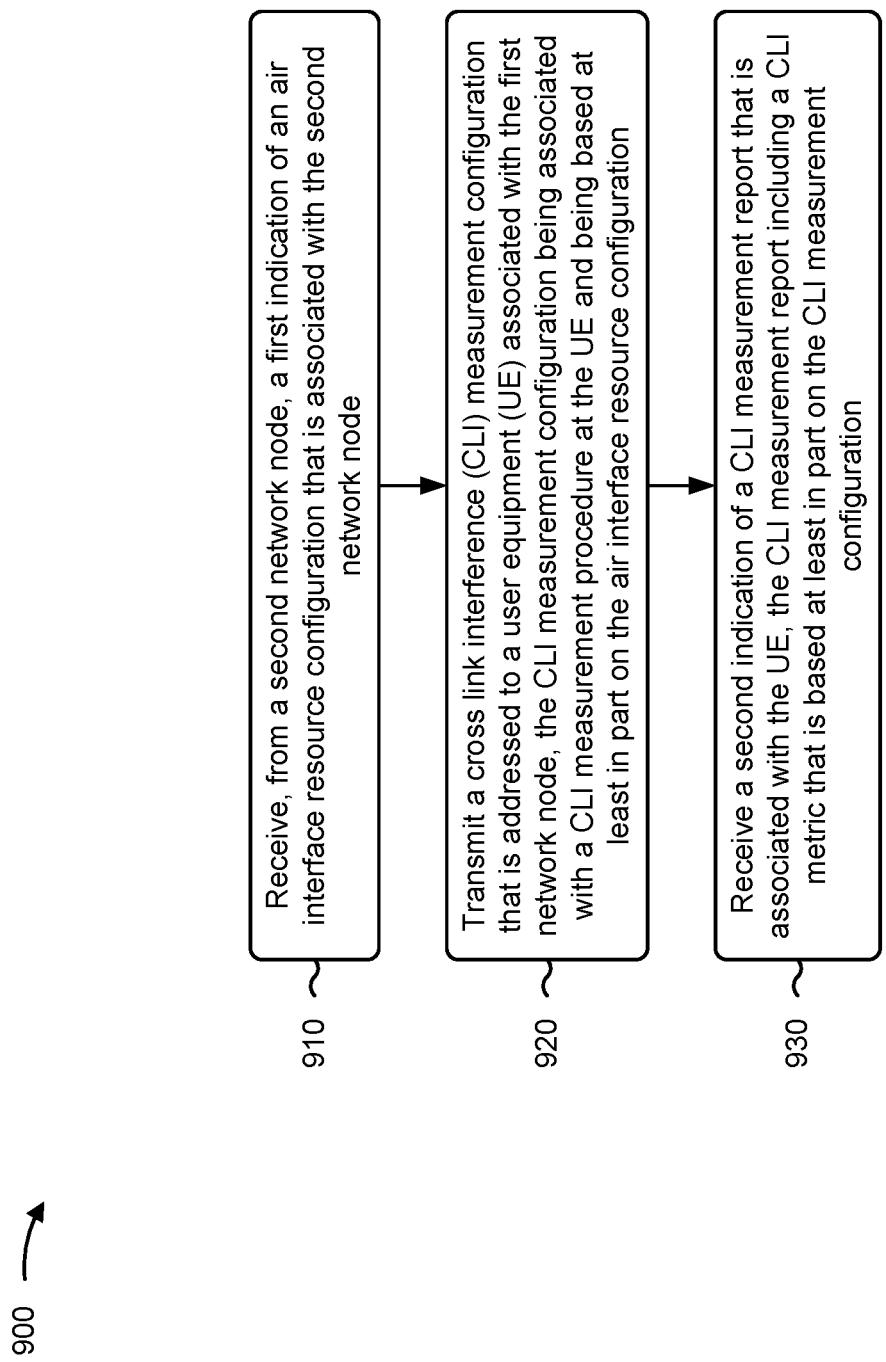
FIG. 9 is a diagram illustrating an example process performed, for example, at a first network node or an apparatus of a first network node, in accordance with the present disclosure.

FIG. 9 is a diagram illustrating an example process 900 performed, for example, at a first network node or an apparatus of a first network node, in accordance with the present disclosure. Example process 900 is an example where the apparatus or the first network node (e.g., first network node 110) performs operations associated with interference mitigation based on UE mobility.

As shown in FIG. 9, in some aspects, process 900 may include receiving, from a second network node, a first indication of an air interface resource configuration that is associated with the second network node (block 910). For example, the first network node (e.g., using reception component 1102 and/or communication manager 1106, depicted in FIG. 11) may receive, from a second network node, a first indication of an air interface resource configuration that is associated with the second network node, as described above.

As further shown in FIG. 9, in some aspects, process 900 may include transmitting a CLI measurement configuration that is addressed to a UE associated with the first network node, the CLI measurement configuration being associated with a CLI measurement procedure at the UE and being based at least in part on the air interface resource configuration (block 920). For example, the first network node (e.g., using transmission component 1104 and/or communication manager 1106, depicted in FIG. 11) may transmit a CLI measurement configuration that is addressed to a UE associated with the first network node, the CLI measurement configuration being associated with a CLI measurement procedure at the UE and being based at least in part on the air interface resource configuration, as described above.

As further shown in FIG. 9, in some aspects, process 900 may include receiving a second indication of a CLI measurement report that is associated with the UE, the CLI measurement report including a CLI metric that is based at least in part on the CLI measurement configuration (block 930). For example, the first network node (e.g., using reception component 1102 and/or communication manager 1106, depicted in FIG. 11) may receive a second indication of a CLI measurement report that is associated with the UE, the CLI measurement report including a CLI metric that is based at least in part on the CLI measurement configuration, as described above.

Process 900 may include additional aspects, such as any single aspect or any combination of aspects described below and/or in connection with one or more other processes described elsewhere herein.

In a first aspect, process 900 includes receiving, prior to receiving the first indication of the air interface resource configuration, a measurement report generated by the UE that indicates at least one of a first measurement metric associated with the first network node, or a second measurement metric associated with the second network node, and transmitting, to the second network node, a request for the air interface resource configuration based at least in part on the measurement report.

In a second aspect, process 900 includes performing a handover of the UE to the second network node based at least in part on the second indication.

In a third aspect, the handover is at least one of: a UE-initiated handover or a network node-initiated handover.

In a fourth aspect, process 900 includes transmitting a CLI conditional handover configuration that is associated with a conditional mobility procedure associated with the UE.

In a fifth aspect, the CLI conditional handover configuration includes at least one of a CLI threshold, or a CLI offset.

In a sixth aspect, process 900 includes transmitting a mobility request message that indicates a CLI trigger event associated with performing at least one of a cell-level mobility procedure, or a beam-level mobility procedure.

In a seventh aspect, the second network node includes at least one of a candidate network node that is associated with a mobility procedure for the UE, or a neighbor network node that satisfies a distance threshold to the first network node and includes capabilities to support the mobility procedure with the UE, or an SBFD capable network node.

In an eighth aspect, the mobility procedure includes at least one of a cell-level mobility procedure, or a beam-level mobility procedure.

In a ninth aspect, the CLI measurement configuration indicates to perform a CLI measurement procedure based at least in part on a CLI resource that includes a first air interface resource that is located within an active downlink BWP associated with the UE, or a second air interface resource that is located outside of the active downlink BWP.

In a tenth aspect, the CLI resource is associated with a candidate network node that includes a capability for performing at least one of a cell-level mobility procedure, or a beam-level mobility procedure.

In an eleventh aspect, process 900 includes transmitting a measurement gap configuration that indicates a duration for a measurement gap associated with a start time for the CLI measurement procedure.

In a twelfth aspect, the CLI measurement configuration indicates at least one of a periodicity associated with performing the CLI measurement procedure, or a time offset associated with performing the CLI measurement procedure.

In a thirteenth aspect, process 900 includes receiving an aperiodic CLI measurement report that is based at least in part on the CLI measurement configuration.

In a fourteenth aspect, the aperiodic CLI measurement report is scheduled by the first network node.

In a fifteenth aspect, the aperiodic CLI measurement report is a UE-triggered aperiodic CLI measurement report.

In a sixteenth aspect, process 900 includes receiving a third indication of an allocation request that is associated with transmission of the aperiodic CLI measurement report, and transmitting a resource assignment that indicates a resource allocation to the UE, and receiving the aperiodic CLI measurement report includes receiving the aperiodic CLI measurement report based at least in part on the resource allocation.

In a seventeenth aspect, the third indication of the allocation request includes at least one of a scheduling request, or UE assistance information.

In an eighteenth aspect, transmitting the resource allocation includes transmitting the resource allocation in at least one of Layer 1 signaling, or Layer 2 signaling.

In a nineteenth aspect, transmitting the resource allocation includes transmitting an activation indication that indicates activation of the resource allocation.

In a twentieth aspect, the CLI measurement configuration indicates to perform the CLI measurement procedure based at least in part on at least one of a wideband air interface resource configuration, a sub-band air interface resource configuration, an intra-cell air interface resource configuration, or an inter-cell air interface resource configuration.

In a twenty-first aspect, process 900 includes receiving UE capability information that indicates a CLI measurement and management capability that is associated with the UE, and selecting the CLI measurement configuration based at least in part on the CLI measurement and management capability.

In a twenty-second aspect, process 900 includes transmitting, prior to performing a handover of the UE to the second network node, an SRS configuration that is based at least in part on the air interface resource configuration associated with the second network node.

In a twenty-third aspect, the SRS configuration includes at least one of an SRS resource configuration, or an SRS transmission scheme.

In a twenty-fourth aspect, the SRS resource configuration indicates time-frequency mapping information associated with transmission of an SRS.

In a twenty-fifth aspect, the SRS transmission scheme indicates at least one of a transmission beam associated with transmission of an SRS, a periodicity associated with the transmission of the SRS, or a time associated with the transmission of the SRS.

In a twenty-sixth aspect, transmitting the SRS configuration includes transmitting the SRS configuration in RRC signaling.

In a twenty-seventh aspect, process 900 includes transmitting Layer 1 signaling or Layer 2 signaling that indicates activation of an SRS transmission that is based at least in part on the SRS configuration.

In a twenty-eighth aspect, process 900 includes transmitting, prior to performing a handover of the UE to the second network node, a PDCCH ordered RACH message that indicates to transmit a PRACH to the second network node.

In a twenty-ninth aspect, process 900 includes receiving a mobility request message that indicates a CLI trigger event associated with performing at least one of a cell-level mobility procedure, or a beam-level mobility procedure.

In a thirtieth aspect, process 900 includes performing a CLI management procedure associated with the UE based at least in part on the second indication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
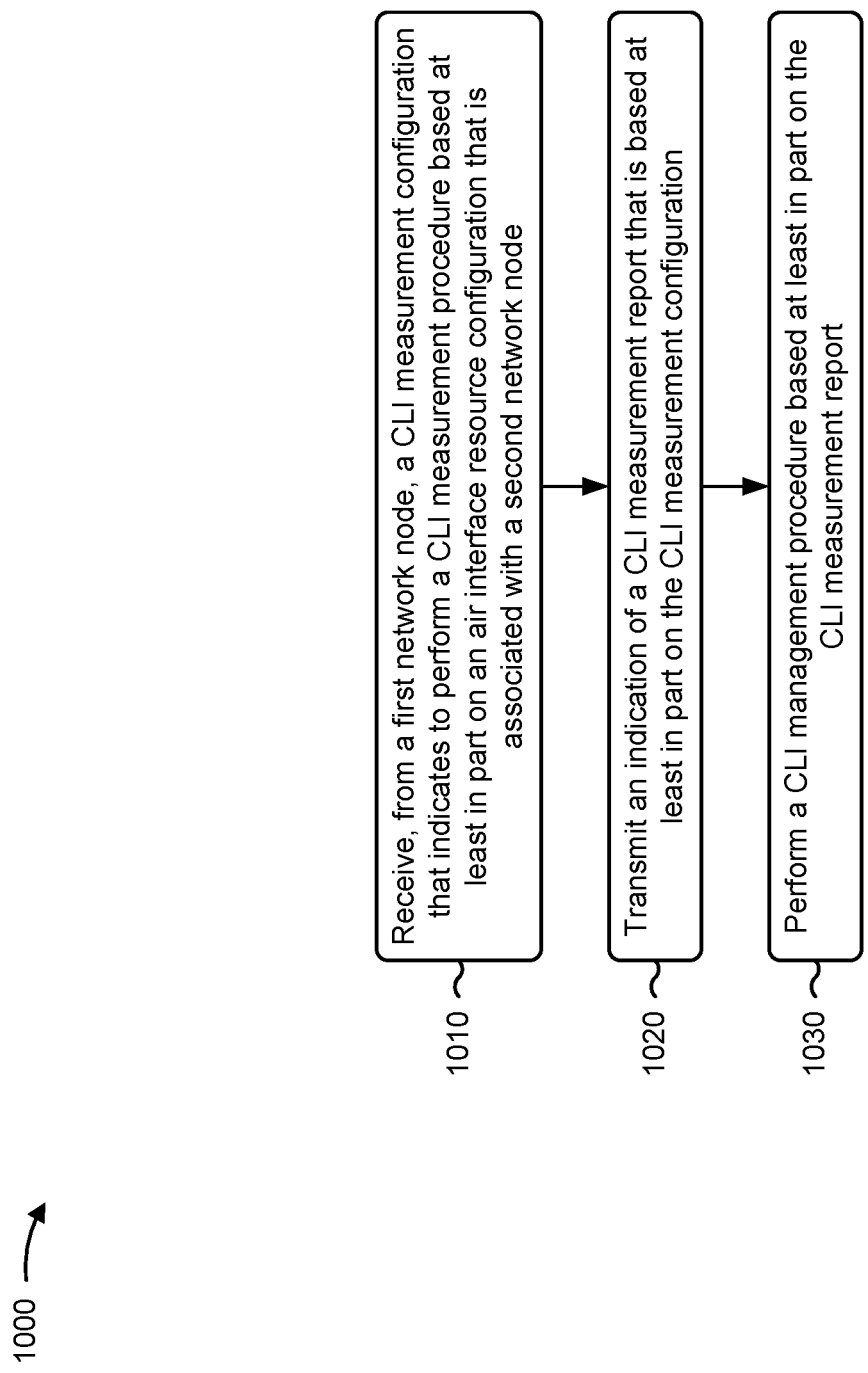
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with interference mitigation based on UE mobility.

As shown in FIG. 10, in some aspects, process 1000 may include receiving, from a first network node, a CLI measurement configuration that indicates to perform a CLI measurement procedure based at least in part on an air interface resource configuration that is associated with a second network node (block 1010). For example, the UE (e.g., using reception component 1202 and/or communication manager 1206, depicted in FIG. 12) may receive, from a first network node, a CLI measurement configuration that indicates to perform a CLI measurement procedure based at least in part on an air interface resource configuration that is associated with a second network node, as described above.

As further shown in FIG. 10, in some aspects, process 1000 may include transmitting an indication of a CLI measurement report that is based at least in part on the CLI measurement configuration (block 1020). For example, the UE (e.g., using transmission component 1204 and/or communication manager 1206, depicted in FIG. 12) may transmit an indication of a CLI measurement report that is based at least in part on the CLI measurement configuration, as described above.

As further shown in FIG. 10, in some aspects, process 1000 may include performing a CLI management procedure based at least in part on the CLI measurement report (block 1030). For example, the UE (e.g., using communication manager 1206, depicted in FIG. 12) may perform a cell-level mobility procedure, such as handover from the first network node to the second network node based at least in part on the CLI measurement report, as described above. As another example, the UE may perform a beam-level mobility procedure.

Process 1000 may include additional aspects, such as any single aspect or any combination of aspects described below and/or in connection with one or more other processes described elsewhere herein.

In a first aspect, process 1000 includes transmitting a measurement report that indicates at least one of a first measurement metric associated with the first network node, or a second measurement metric associated with the second network node.

In a second aspect, the CLI mobility procedure is at least one of: a UE-initiated handover or a network node-initiated handover.

In a third aspect, process 1000 includes receiving a CLI conditional handover configuration that is associated with the CLI measurement configuration, and determining to perform the UE-initiated handover based at least in part on the CLI conditional handover configuration.

In a fourth aspect, the CLI conditional handover configuration includes at least one of a CLI threshold, or a CLI offset.

In a fifth aspect, the second network node includes at least one of a candidate network node that is associated with a mobility procedure for the UE, or a neighbor network node that satisfies a distance threshold to the first network node and includes capabilities to support the mobility procedure with the UE, or an SBFD capable network node.

In a sixth aspect, the mobility procedure includes at least one of a cell-level mobility procedure, or a beam-level mobility procedure.

In a seventh aspect, the CLI measurement configuration indicates to perform a CLI measurement procedure based at least in part on a CLI resource that includes a first air interface resource that is located within an active downlink BWP associated with the UE, or a second air interface resource that is located outside of the active downlink BWP.

In an eighth aspect, the CLI resource is associated with a candidate network node that includes a capability for performing at least one of a cell-level mobility procedure, or a beam-level mobility procedure.

In a ninth aspect, process 1000 includes receiving a measurement gap configuration that indicates a duration for a measurement gap that is associated with a start time for the CLI measurement procedure.

In a tenth aspect, the CLI measurement configuration indicates at least one of a periodicity associated with performing the CLI measurement procedure, or a time offset associated with performing the CLI measurement procedure.

In an eleventh aspect, process 1000 includes transmitting an aperiodic CLI measurement report that is based at least in part on the CLI measurement configuration.

In a twelfth aspect, the aperiodic CLI measurement report is scheduled by the first network node.

In a thirteenth aspect, the aperiodic CLI measurement report is a UE-triggered aperiodic CLI measurement report.

In a fourteenth aspect, process 1000 includes transmitting a third indication of an allocation request that is associated with transmission of the aperiodic CLI measurement report, and receiving a resource assignment that indicates a resource allocation, and transmitting the aperiodic CLI measurement report includes transmitting the aperiodic CLI measurement report based at least in part on the resource allocation.

In a fifteenth aspect, the third indication of the allocation request includes at least one of a scheduling request, or UE assistance information.

In a sixteenth aspect, receiving the resource assignment includes receiving the resource assignment in at least one of Layer 1 signaling, or Layer 2 signaling.

In a seventeenth aspect, receiving the resource assignment includes receiving an activation indication that indicates activation of the resource assignment.

In an eighteenth aspect, the CLI measurement configuration indicates to perform the CLI measurement procedure based at least in part on at least one of a wideband air interface resource configuration, a sub-band air interface resource configuration, an intra-cell air interface resource configuration, or an inter-cell air interface resource configuration.

In a nineteenth aspect, process 1000 includes transmitting UE capability information that indicates a CLI measurement and management capability that is associated with the UE, and the CLI measurement configuration is based at least in part on the CLI measurement and management capability.

In a twentieth aspect, process 1000 includes receiving, prior to performing the CLI mobility procedure, an SRS configuration that is based at least in part on the air interface resource configuration associated with the second network node.

In a twenty-first aspect, the SRS configuration includes at least one of an SRS resource configuration, or an SRS transmission scheme.

In a twenty-second aspect, the SRS resource configuration indicates time-frequency mapping information associated with transmission of an SRS.

In a twenty-third aspect, the SRS transmission scheme indicates at least one of a transmission beam associated with transmission of an SRS, a periodicity associated with the transmission of the SRS, or a time associated with the transmission of the SRS.

In a twenty-fourth aspect, receiving the SRS configuration includes receiving the SRS configuration in RRC signaling.

In a twenty-fifth aspect, process 1000 includes receiving Layer 1 signaling or Layer 2 signaling that indicates activation of an SRS transmission that is based at least in part on the SRS configuration.

In a twenty-sixth aspect, process 1000 includes receiving, prior to performing the CLI mobility procedure, a PDCCH ordered RACH message that indicates to transmit a PRACH to the second network node.

In a twenty-seventh aspect, the CLI management procedure includes at least one of: a cell-level mobility procedure, or a beam-level mobility procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
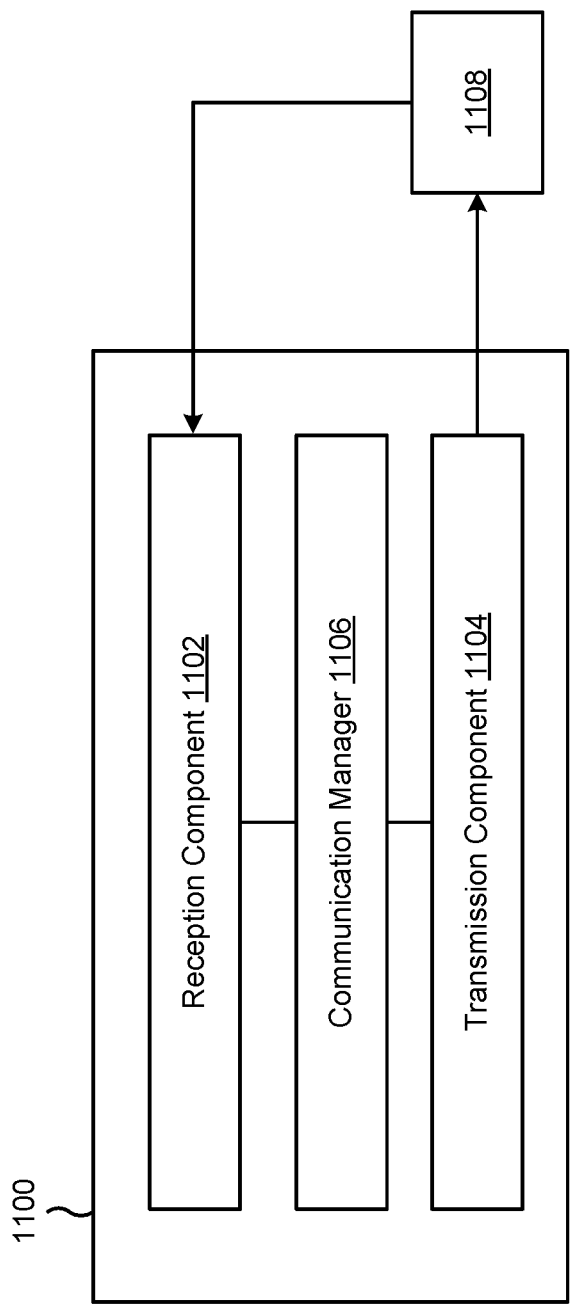
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node (e.g., a network node 110), or a network node (e.g., a network node 110) may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-10. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a second network node, a first indication of an air interface resource configuration that is associated with the second network node. The transmission component 1104 may transmit a CLI measurement configuration that is addressed to a UE associated with the first network node, the CLI measurement configuration being associated with a CLI measurement procedure at the UE and being based at least in part on the air interface resource configuration. The reception component 1102 may receive a second indication of a CLI measurement report that is associated with the UE, the CLI measurement report including a CLI metric that is based at least in part on the CLI measurement configuration.

The reception component 1102 may receive, prior to receiving the first indication of the air interface resource configuration, a measurement report generated by the UE that indicates at least one of a first measurement metric associated with the first network node, or a second measurement metric associated with the second network node. Alternatively, or additionally, the transmission component 1104 may transmit, to the second network node, a request for the air interface resource configuration based at least in part on the measurement report.

The communication manager 1106 may perform a handover of the UE to the second network node based at least in part on the second indication. In some aspects, the transmission component 1104 may transmit a CLI conditional handover configuration that is associated with a conditional mobility procedure associated with the UE. Alternatively, or additionally, the transmission component 1104 may transmit a mobility request message that indicates a CLI trigger event associated with performing at least one of a cell-level mobility procedure, or a beam-level mobility procedure. In some aspects, the transmission component 1104 may transmit a measurement gap configuration that indicates a duration for a measurement gap associated with a start time for the CLI measurement procedure.

The reception component 1102 may receive an aperiodic CLI measurement report that is based at least in part on the CLI measurement configuration. Alternatively, or additionally, the reception component 1102 may receive a third indication of an allocation request that is associated with transmission of the aperiodic CLI measurement report. The transmission component 1104 may transmit a resource assignment that indicates a resource allocation to the UE.

In some aspects, the reception component 1102 may receive UE capability information that indicates a CLI measurement and management capability that is associated with the UE (e.g., a CLI measurement capability and/or a CLI management capability). The communication manager 1106 may select the CLI measurement configuration based at least in part on the CLI measurement and management capability.

The transmission component 1104 may transmit, prior to performing a handover of the UE to the second network node, an SRS configuration that is based at least in part on the air interface resource configuration associated with the second network node. Alternatively, or additionally, the transmission component 1104 may transmit Layer 1 signaling or Layer 2 signaling that indicates activation of an SRS transmission that is based at least in part on the SRS configuration.

In some aspects, the transmission component 1104 may transmit, prior to performing a handover of the UE to the second network node, a PDCCH ordered RACH message that indicates to transmit a PRACH to the second network node. Alternatively, or additionally, the reception component 1102 may receive a mobility request message that indicates a CLI trigger event associated with performing at least one of a cell-level mobility procedure, or a beam-level mobility procedure.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
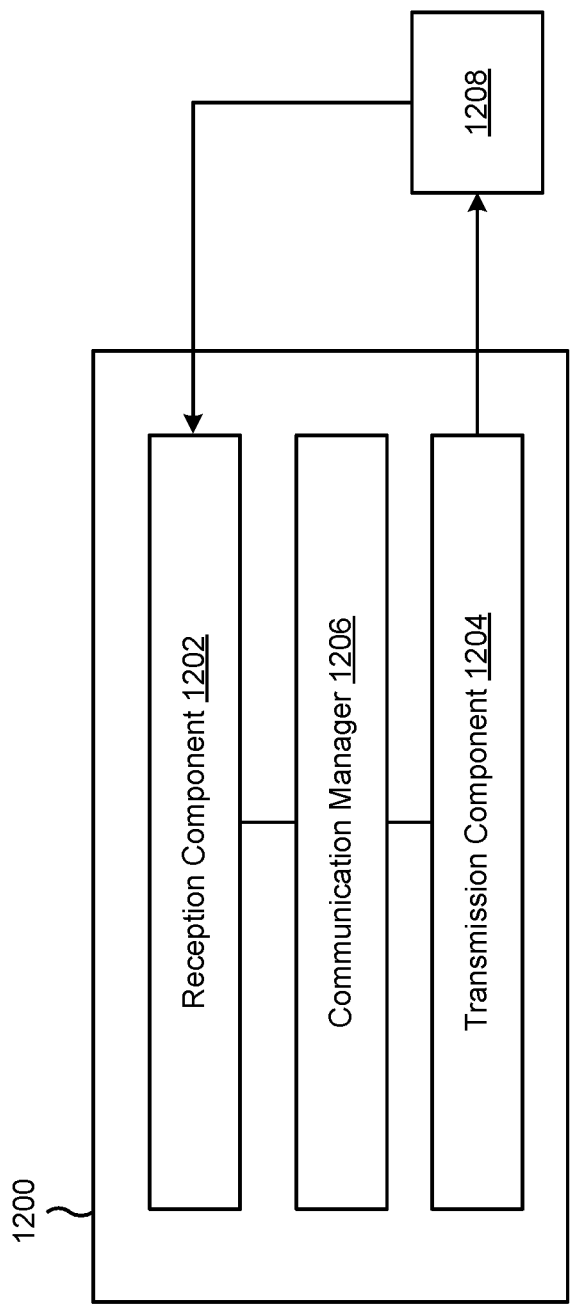
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-10. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a first network node, a CLI measurement configuration that indicates to perform a CLI measurement procedure based at least in part on an air interface resource configuration that is associated with a second network node. The transmission component 1204 may transmit an indication of a CLI measurement report that is based at least in part on the CLI measurement configuration. The communication manager 1206 may perform a CLI mobility procedure based at least in part on the CLI measurement report, such as a cell-level mobility procedure associated with performing a handover from the first network node to the second network node.

The transmission component 1204 may transmit a measurement report that indicates at least one of a first measurement metric associated with the first network node, or a second measurement metric associated with the second network node. In some aspects, the reception component 1202 may receive a CLI conditional handover configuration that is associated with the CLI measurement configuration. The communication manager 1206 may determine to perform a UE-initiated handover based at least in part on the CLI conditional handover configuration. In some aspects, the reception component 1202 may receive a measurement gap configuration that indicates a duration for a measurement gap that is associated with a start time for the CLI measurement procedure.

The transmission component 1204 may transmit an aperiodic CLI measurement report that is based at least in part on the CLI measurement configuration. The transmission component 1204 may transmit an indication of an allocation request that is associated with transmission of the aperiodic CLI measurement report. Alternatively, or additionally, the reception component 1202 may receive a resource assignment that indicates a resource allocation.

The transmission component 1204 may transmit UE capability information that indicates a CLI measurement and management capability that is associated with the UE, and the CLI measurement configuration is based at least in part on the CLI measurement and management capability.

In some aspects, the reception component 1202 may receive, prior to performing the CLI management procedure, a PDCCH ordered RACH message that indicates to transmit a PRACH to the second network node. Alternatively, or additionally, the reception component 1202 may receive, prior to performing the CLI management procedure, an SRS configuration that is based at least in part on the air interface resource configuration associated with the second network node. In some aspects, the reception component 1202 may receive Layer 1 signaling or Layer 2 signaling that indicates activation of an SRS transmission that is based at least in part on the SRS configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first network node, comprising: receiving, from a second network node, a first indication of an air interface resource configuration that is associated with the second network node; transmitting a cross link interference (CLI) measurement configuration that is addressed to a user equipment (UE) associated with the first network node, the CLI measurement configuration being associated with a CLI measurement procedure at the UE and being based at least in part on the air interface resource configuration; and receiving a second indication of a CLI measurement report that is associated with the UE, the CLI measurement report including a CLI metric that is based at least in part on the CLI measurement configuration.

Aspect 2: The method of Aspect 1, further comprising: receiving, prior to receiving the first indication of the air interface resource configuration, a measurement report generated by the UE that indicates at least one of: a first measurement metric associated with the first network node, or a second measurement metric associated with the second network node; and transmitting, to the second network node, a request for the air interface resource configuration based at least in part on the measurement report.

Aspect 3: The method of any of Aspects 1-2, further comprising: performing a handover of the UE to the second network node based at least in part on the second indication.

Aspect 4: The method of Aspect 3, wherein the handover is at least one of: a UE-initiated handover or a network node-initiated handover.

Aspect 5: The method of any of Aspects 1-4, further comprising: transmitting a CLI conditional handover configuration that is associated with a conditional mobility procedure associated with the UE.

Aspect 6: The method of Aspect 5, wherein the CLI conditional handover configuration comprises at least one of: a CLI threshold, or a CLI offset.

Aspect 7: The method of any of Aspects 1-6, further comprising: transmitting a mobility request message that indicates a CLI trigger event associated with performing at least one of: a cell-level mobility procedure, or a beam-level mobility procedure.

Aspect 8: The method of any of Aspects 1-7, wherein the second network node comprises at least one of: a candidate network node that is associated with a mobility procedure for the UE, or a neighbor network node that satisfies a distance threshold to the first network node and includes capabilities to support the mobility procedure with the UE, or a sub-band full duplex (SBFD) capable network node.

Aspect 9: The method of Aspect 8, wherein the mobility procedure comprises at least one of: a cell-level mobility procedure, or a beam-level mobility procedure.

Aspect 10: The method of any of Aspects 1-9, wherein the CLI measurement configuration indicates to perform a CLI measurement procedure based at least in part on a CLI resource that comprises: a first air interface resource that is located within an active downlink bandwidth part (BWP) associated with the UE, or a second air interface resource that is located outside of the active downlink BWP.

Aspect 11: The method of Aspect 10, wherein the CLI resource is associated with a candidate network node that includes a capability for performing at least one of: a cell-level mobility procedure, or a beam-level mobility procedure.

Aspect 12: The method of Aspect 10, further comprising: transmitting a measurement gap configuration that indicates a duration for a measurement gap associated with a start time for the CLI measurement procedure.

Aspect 13: The method of any of Aspects 1-12, wherein the CLI measurement configuration indicates at least one of: a periodicity associated with performing the CLI measurement procedure, or a time offset associated with performing the CLI measurement procedure.

Aspect 14: The method of any of Aspects 1-13, further comprising: receiving an aperiodic CLI measurement report that is based at least in part on the CLI measurement configuration.

Aspect 15: The method of Aspect 14, wherein the aperiodic CLI measurement report is scheduled by the first network node.

Aspect 16: The method of Aspect 14, wherein the aperiodic CLI measurement report is a UE-triggered aperiodic CLI measurement report.

Aspect 17: The method of Aspect 14, further comprising: receiving a third indication of an allocation request that is associated with transmission of the aperiodic CLI measurement report; and transmitting a resource assignment that indicates a resource allocation to the UE, wherein receiving the aperiodic CLI measurement report comprises: receiving the aperiodic CLI measurement report based at least in part on the resource allocation, wherein receiving the aperiodic CLI measurement report comprises: receiving the aperiodic CLI measurement report based at least in part on the resource allocation.

Aspect 18: The method of Aspect 17, wherein the third indication of the allocation request comprises at least one of: a scheduling request, or UE assistance information.

Aspect 19: The method of Aspect 17, wherein transmitting the resource allocation comprises: transmitting the resource allocation in at least one of: Layer 1 signaling, or Layer 2 signaling.

Aspect 20: The method of Aspect 19, wherein transmitting the resource allocation comprises: transmitting an activation indication that indicates activation of the resource allocation.

Aspect 21: The method of any of Aspects 1-20, wherein the CLI measurement configuration indicates to perform the CLI measurement procedure based at least in part on at least one of: a wideband air interface resource configuration, a sub-band air interface resource configuration, an intra-cell air interface resource configuration, or an inter-cell air interface resource configuration.

Aspect 22: The method of any of Aspects 1-21, further comprising: receiving UE capability information that indicates a CLI measurement and management capability that is associated with the UE; and selecting the CLI measurement configuration based at least in part on the CLI measurement and management capability.

Aspect 23: The method of any of Aspects 1-22, further comprising: transmitting, prior to performing a handover of the UE to the second network node, a sounding reference signal (SRS) configuration that is based at least in part on the air interface resource configuration associated with the second network node.

Aspect 24: The method of Aspect 23, wherein the SRS configuration comprises at least one of: an SRS resource configuration, or an SRS transmission scheme.

Aspect 25: The method of Aspect 24, wherein the SRS resource configuration indicates time-frequency mapping information associated with transmission of an SRS.

Aspect 26: The method of Aspect 24, wherein the SRS transmission scheme indicates at least one of: a transmission beam associated with transmission of an SRS, a periodicity associated with the transmission of the SRS, or a time associated with the transmission of the SRS.

Aspect 27: The method of Aspect 23, wherein transmitting the SRS configuration comprises: transmitting the SRS configuration in radio resource control (RRC) signaling.

Aspect 28: The method of Aspect 23, further comprising: transmitting Layer 1 signaling or Layer 2 signaling that indicates activation of an SRS transmission that is based at least in part on the SRS configuration.

Aspect 29: The method of any of Aspects 1-28, further comprising: transmitting, prior to performing a handover of the UE to the second network node, a physical downlink control channel (PDCCH) ordered random access channel (RACH) message that indicates to transmit a physical random access channel (PRACH) to the second network node.

Aspect 30: The method of any one of Aspects 1-29, further comprising: performing a CLI management procedure associated with the UE based at least in part on the second indication.

Aspect 31: A method of wireless communication performed by a user equipment (UE), comprising: receiving, from a first network node, a cross link interference (CLI) measurement configuration that indicates to perform a CLI measurement procedure based at least in part on an air interface resource configuration that is associated with a second network node; transmitting an indication of a CLI measurement report that is based at least in part on the CLI measurement configuration; and performing a CLI management procedure based at least in part on the CLI measurement report.

Aspect 32: The method of Aspect 31, further comprising: transmitting a measurement report that indicates at least one of: a first measurement metric associated with the first network node, or a second measurement metric associated with the second network node.

Aspect 33: The method of any of Aspects 31-32, wherein the CLI management procedure is at least one of: a UE-initiated handover or a network node-initiated handover.

Aspect 34: The method of Aspect 33, further comprising: receiving a CLI conditional handover configuration that is associated with the CLI measurement configuration; and determining to perform the UE-initiated handover based at least in part on the CLI conditional handover configuration.

Aspect 35: The method of Aspect 34, wherein the CLI conditional handover configuration comprises at least one of: a CLI threshold, or a CLI offset.

Aspect 36: The method of Aspect 31-35, further comprising: receiving a mobility request message that indicates a CLI trigger event associated with performing at least one of: a cell-level mobility procedure, or a beam-level mobility procedure.

Aspect 37: The method of any of Aspects 31-36, wherein the second network node comprises at least one of: a candidate network node that is associated with a mobility procedure for the UE, or a neighbor network node that satisfies a distance threshold to the first network node and includes capabilities to support the mobility procedure with the UE, or a sub-band full duplex (SBFD) capable network node.

Aspect 38: The method of Aspect 37, wherein the mobility procedure comprises at least one of: a cell-level mobility procedure, or a beam-level mobility procedure.

Aspect 39: The method of any of Aspects 31-38, wherein the CLI measurement configuration indicates to perform a CLI measurement procedure based at least in part on a CLI resource that comprises: a first air interface resource that is located within an active downlink bandwidth part (BWP) associated with the UE, or a second air interface resource that is located outside of the active downlink BWP.

Aspect 40: The method of Aspect 39, wherein the CLI resource is associated with a candidate network node that includes a capability for performing at least one of: a cell-level mobility procedure, or a beam-level mobility procedure.

Aspect 41: The method of Aspect 39, further comprising: receiving a measurement gap configuration that indicates a duration for a measurement gap that is associated with a start time for the CLI measurement procedure.

Aspect 42: The method of any of Aspects 31-41, wherein the CLI measurement configuration indicates at least one of: a periodicity associated with performing the CLI measurement procedure, or a time offset associated with performing the CLI measurement procedure.

Aspect 43: The method of any of Aspects 31-42, further comprising:
transmitting an aperiodic CLI measurement report that is based at least in part on the CLI measurement configuration.

Aspect 44: The method of Aspect 43, wherein the aperiodic CLI measurement report is scheduled by the first network node.

Aspect 45: The method of Aspect 43, wherein the aperiodic CLI measurement report is a UE-triggered aperiodic CLI measurement report.

Aspect 46: The method of Aspect 43, further comprising: transmitting a third indication of an allocation request that is associated with transmission of the aperiodic CLI measurement report; and receiving a resource assignment that indicates a resource allocation, wherein transmitting the aperiodic CLI measurement report comprises: transmitting the aperiodic CLI measurement report based at least in part on the resource allocation, wherein transmitting the aperiodic CLI measurement report comprises: transmitting the aperiodic CLI measurement report based at least in part on the resource allocation.

Aspect 47: The method of Aspect 46, wherein the third indication of the allocation request comprises at least one of: a scheduling request, or UE assistance information.

Aspect 48: The method of Aspect 46, wherein receiving the resource assignment comprises: receiving the resource assignment in at least one of: Layer 1 signaling, or Layer 2 signaling.

Aspect 49: The method of Aspect 48, wherein receiving the resource assignment comprises: receiving an activation indication that indicates activation of the resource assignment.

Aspect 50: The method of any of Aspects 31-49, wherein the CLI measurement configuration indicates to perform the CLI measurement procedure based at least in part on at least one of: a wideband air interface resource configuration, a sub-band air interface resource configuration, an intra-cell air interface resource configuration, or an inter-cell air interface resource configuration.

Aspect 51: The method of any of Aspects 31-50, further comprising: transmitting UE capability information that indicates a CLI measurement and management capability that is associated with the UE, wherein the CLI measurement configuration is based at least in part on the CLI measurement and management capability.

Aspect 52: The method of any of Aspects 31-51, further comprising: receiving, prior to performing the CLI management procedure, a sounding reference signal (SRS) configuration that is based at least in part on the air interface resource configuration associated with the second network node.

Aspect 53: The method of Aspect 52, wherein the SRS configuration comprises at least one of: an SRS resource configuration, or an SRS transmission scheme.

Aspect 54: The method of Aspect 53, wherein the SRS resource configuration indicates time-frequency mapping information associated with transmission of an SRS.

Aspect 55: The method of Aspect 53, wherein the SRS transmission scheme indicates at least one of: a transmission beam associated with transmission of an SRS, a periodicity associated with the transmission of the SRS, or a time associated with the transmission of the SRS.

Aspect 56: The method of Aspect 52, wherein receiving the SRS configuration comprises: receiving the SRS configuration in radio resource control (RRC) signaling.

Aspect 57: The method of Aspect 52, further comprising: receiving Layer 1 signaling or Layer 2 signaling that indicates activation of an SRS transmission that is based at least in part on the SRS configuration.

Aspect 58: The method of any of Aspects 31-57, further comprising: receiving, prior to performing the CLI management procedure, a physical downlink control channel (PDCCH) ordered random access channel (RACH) message that indicates to transmit a physical random access channel (PRACH) to the second network node.

Aspect 59: The method of any of Aspects 31-59, wherein the CLI management procedure comprises at least one of: a cell-level mobility procedure, or a beam-level mobility procedure.

Aspect 60: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-30.

Aspect 61: An apparatus for wireless communication at a device, the apparatus comprising one or more memories and one or more processors coupled to the one or more memories, the one or more processors configured, individually or collectively, to cause the device to perform the method of one or more of Aspects 1-30.

Aspect 62: An apparatus for wireless communication, the apparatus comprising at least one means for performing the method of one or more of Aspects 1-30.

Aspect 63: A non-transitory computer-readable medium storing code for wireless communication, the code comprising instructions executable by one or more processors to perform the method of one or more of Aspects 1-30.

Aspect 64: A non-transitory computer-readable medium storing a set of instructions for wireless communication, the set of instructions comprising one or more instructions that, when executed by one or more processors of a device, cause the device to perform the method of one or more of Aspects 1-30.

Aspect 65: A device for wireless communication, the device comprising a processing system that includes one or more processors and one or more memories coupled with the one or more processors, the processing system configured to cause the device to perform the method of one or more of Aspects 1-30.

Aspect 66: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 31-59.

Aspect 67: An apparatus for wireless communication at a device, the apparatus comprising one or more memories and one or more processors coupled to the one or more memories, the one or more processors configured, individually, or collectively, to cause the device to perform the method of one or more of Aspects 31-59.

Aspect 68: An apparatus for wireless communication, the apparatus comprising at least one means for performing the method of one or more of Aspects 31-59.

Aspect 69: A non-transitory computer-readable medium storing code for wireless communication, the code comprising instructions executable by one or more processors to perform the method of one or more of Aspects 31-59.

Aspect 70: A non-transitory computer-readable medium storing a set of instructions for wireless communication, the set of instructions comprising one or more instructions that, when executed by one or more processors of a device, cause the device to perform the method of one or more of Aspects 31-59.

Aspect 71: A device for wireless communication, the device comprising a processing system that includes one or more processors and one or more memories coupled with the one or more processors, the processing system configured to cause the device to perform the method of one or more of Aspects 31-59.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network node, comprising:
   one or more memories; and
   one or more processors, coupled to the one or more memories, configured, individually or collectively, to:
   receive, from a second network node, a first indication of an air interface resource configuration that is associated with the second network node;
   transmit a cross link interference (CLI) measurement configuration that is addressed to a user equipment (UE) associated with the first network node, the CLI measurement configuration being associated with a CLI measurement procedure at the UE and being based at least in part on the air interface resource configuration; and
   receive a second indication of a CLI measurement report that is associated with the UE, the CLI measurement report including a CLI metric that is based at least in part on the CLI measurement configuration.

2. The apparatus of claim 1, wherein the one or more processors are further configured to:
   receive, prior to receiving the first indication of the air interface resource configuration, a measurement report generated by the UE that indicates at least one of:
   a first measurement metric associated with the first network node, or
   a second measurement metric associated with the second network node; and
   transmit, to the second network node, a request for the air interface resource configuration based at least in part on the measurement report.

3. The apparatus of claim 1, wherein the one or more processors are further configured to:
   perform a handover of the UE to the second network node based at least in part on the second indication.

4. The apparatus of claim 1, wherein the one or more processors are further configured to:
   transmit a CLI conditional handover configuration that is associated with a conditional mobility procedure associated with the UE.

5. The apparatus of claim 1, wherein the one or more processors are further configured to:
   transmit a mobility request message that indicates a CLI trigger event associated with performing at least one of:
   a cell-level mobility procedure, or
   a beam-level mobility procedure.

6. The apparatus of claim 1, wherein the second network node comprises at least one of:
   a candidate network node that is associated with a mobility procedure for the UE, or
   a neighbor network node that satisfies a distance threshold to the first network node and includes capabilities to support the mobility procedure with the UE, or
   a sub-band full duplex (SBFD) capable network node.

7. The apparatus of claim 1, wherein the CLI measurement configuration indicates to perform a CLI measurement procedure based at least in part on a CLI resource that comprises:
   a first air interface resource that is located within an active downlink bandwidth part (BWP) associated with the UE, or
   a second air interface resource that is located outside of the active downlink BWP.

8. The apparatus of claim 7, wherein the one or more processors are further configured to:
   transmit a measurement gap configuration that indicates a duration for a measurement gap associated with a start time for the CLI measurement procedure.

9. The apparatus of claim 1, wherein the one or more processors are further configured to:

receive an aperiodic CLI measurement report that is based at least in part on the CLI measurement configuration.

10. The apparatus of claim 9, wherein the aperiodic CLI measurement report is scheduled by the first network node.

11. The apparatus of claim 9, wherein the one or more processors are further configured to:
   receive a third indication of an allocation request that is associated with transmission of the aperiodic CLI measurement report; and
   transmit a resource assignment that indicates a resource allocation to the UE,
   wherein the one or more processors, to receive the aperiodic CLI measurement report, are configured to:
      receive the aperiodic CLI measurement report based at least in part on the resource allocation.

12. The apparatus of claim 1, wherein the CLI measurement configuration indicates to perform the CLI measurement procedure based at least in part on at least one of:
   a wideband air interface resource configuration,
   a sub-band air interface resource configuration,
   an intra-cell air interface resource configuration, or
   an inter-cell air interface resource configuration.

13. The apparatus of claim 1, wherein the one or more processors are further configured to:
   receive UE capability information that indicates a CLI measurement and management capability that is associated with the UE; and
   select the CLI measurement configuration based at least in part on the CLI measurement and management capability.

14. The apparatus of claim 1, wherein the one or more processors are further configured to:
   transmit, prior to performing a handover of the UE to the second network node, a sounding reference signal (SRS) configuration that is based at least in part on the air interface resource configuration associated with the second network node.

15. The apparatus of claim 1, wherein the one or more processors are further configured to:
   transmit, prior to performing a handover of the UE to the second network node, a physical downlink control channel (PDCCH) ordered random access channel (RACH) message that indicates to transmit a physical random access channel (PRACH) to the second network node.

16. An apparatus for wireless communication at a user equipment (UE), comprising:
   one or more memories; and
   one or more processors, coupled to the one or more memories, configured, individually or collectively, to:
      receive, from a first network node, a cross link interference (CLI) measurement configuration that indicates to perform a CLI measurement procedure based at least in part on an air interface resource configuration that is associated with a second network node;
      transmit an indication of a CLI measurement report that is based at least in part on the CLI measurement configuration; and
      perform a CLI management procedure based at least in part on the CLI measurement report.

17. The apparatus of claim 16, wherein the one or more processors are further configured to:
   transmit a measurement report that indicates at least one of:
      a first measurement metric associated with the first network node, or
      a second measurement metric associated with the second network node.

18. The apparatus of claim 16, wherein the CLI management procedure comprises at least one of:
   a UE-initiated handover, or
   a network node-initiated handover.

19. The apparatus of claim 18, wherein the one or more processors are further configured to:
   receive a CLI conditional handover configuration that is associated with the CLI measurement configuration; and
   determine to perform the UE-initiated handover based at least in part on the CLI conditional handover configuration.

20. The apparatus of claim 16, wherein the one or more processors are further configured to:
   receive a mobility request message that indicates a CLI trigger event associated with performing at least one of:
      a cell-level mobility procedure, or
      a beam-level mobility procedure.

21. The apparatus of claim 16, wherein the second network node comprises at least one of:
   a candidate network node that is associated with a mobility procedure for the UE, or
   a neighbor network node that satisfies a distance threshold to the first network node and includes capabilities to support the mobility procedure with the UE, or
   a sub-band full duplex (SBFD) capable network node.

22. The apparatus of claim 16, wherein the CLI measurement configuration indicates to perform a CLI measurement procedure based at least in part on a CLI resource that comprises:
   a first air interface resource that is located within an active downlink bandwidth part (BWP) associated with the UE, or
   a second air interface resource that is located outside of the active downlink BWP.

23. The apparatus of claim 16, wherein the one or more processors are further configured to:
   transmit an aperiodic CLI measurement report that is based at least in part on the CLI measurement configuration.

24. The apparatus of claim 16, wherein the one or more processors are further configured to:
   transmit UE capability information that indicates a CLI measurement and management capability that is associated with the UE,
   wherein the CLI measurement configuration is based at least in part on the CLI measurement and management capability.

25. The apparatus of claim 16, wherein the one or more processors are further configured to:
   receive, prior to performing the CLI management procedure, a sounding reference signal (SRS) configuration that is based at least in part on the air interface resource configuration associated with the second network node.

26. The apparatus of claim 16, wherein the one or more processors are further configured to:
   receive, prior to performing the CLI management procedure, a physical downlink control channel (PDCCH) ordered random access channel (RACH) message that indicates to transmit a physical random access channel (PRACH) to the second network node.

27. A method of wireless communication performed by a first network node, comprising:

receiving, from a second network node, a first indication of an air interface resource configuration that is associated with the second network node;

transmitting a cross link interference (CLI) measurement configuration that is addressed to a user equipment (UE) associated with the first network node, the CLI measurement configuration being associated with a CLI measurement procedure at the UE and being based at least in part on the air interface resource configuration; and receiving a second indication of a CLI measurement report that is associated with the UE, the CLI measurement report including a CLI metric that is based at least in part on the CLI measurement configuration.

28. The method of claim 27, further comprising:

performing a CLI management procedure associated with the UE based at least in part on the second indication.

29. A method of wireless communication performed by a user equipment (UE), comprising:

receiving, from a first network node, a cross link interference (CLI) measurement configuration that indicates to perform a CLI measurement procedure based at least in part on an air interface resource configuration that is associated with a second network node;

transmitting an indication of a CLI measurement report that is based at least in part on the CLI measurement configuration; and performing a CLI management procedure based at least in part on the CLI measurement report.

30. The method of claim 29, wherein the CLI management procedure comprises at least one of:

a cell-level mobility procedure, or a beam-level mobility procedure.

* * * * *